(12) United States Patent
Mouilleseaux et al.

(10) Patent No.: US 7,884,834 B2
(45) Date of Patent: Feb. 8, 2011

(54) IN-CONTEXT PAINT STROKE CHARACTERISTIC ADJUSTMENT

(75) Inventors: Jean-Pierre Mouilleseaux, Venice, CA (US); Stephen Sheeler, Santa Monica, CA (US); Gregory Niles, Culver City, CA (US)

(73) Assignee: Apple Inc., Cupertino, CA (US)

( * ) Notice: Subject to any disclaimer, the term of this patent is extended or adjusted under 35 U.S.C. 154(b) by 747 days.

(21) Appl. No.: 11/734,933

(22) Filed: Apr. 13, 2007

(65) Prior Publication Data

US 2008/0252645 A1    Oct. 16, 2008

(51) Int. Cl.
*G09G 5/00* (2006.01)
*G06T 11/20* (2006.01)
*G06F 3/048* (2006.01)
*G06F 3/00* (2006.01)
*G06F 19/00* (2006.01)
*G05B 15/00* (2006.01)

(52) U.S. Cl. ............ 345/619; 345/441; 345/442; 345/680; 715/788; 715/720; 700/83; 700/98

(58) Field of Classification Search ......... 345/442, 345/441, 619, 680; 700/83, 98; 715/720, 715/788
See application file for complete search history.

(56) References Cited

U.S. PATENT DOCUMENTS

| | | | | |
|---|---|---|---|---|
| 4,660,028 A * | 4/1987 | Yu | .............. | 345/17 |
| 5,611,036 A * | 3/1997 | Berend et al. | .............. | 345/441 |
| 5,835,086 A * | 11/1998 | Bradstreet et al. | .......... | 345/581 |
| 6,154,221 A * | 11/2000 | Gangnet | .............. | 345/442 |
| 6,441,823 B1 * | 8/2002 | Ananya | .............. | 345/442 |
| 6,970,169 B1 * | 11/2005 | Harris | .............. | 345/440 |
| 7,091,963 B2 * | 8/2006 | Dresevic et al. | .............. | 345/173 |
| 7,218,326 B1 * | 5/2007 | Bogues et al. | .............. | 345/442 |
| 7,496,416 B2 * | 2/2009 | Ferguson et al. | .............. | 700/83 |

OTHER PUBLICATIONS

Riddle, Danny. Maya 4.5 for Windows and Macintosh: Visual Quickstart. Print, Mar. 28, 2003, Chapter 5, 10 and 14.*

* cited by examiner

*Primary Examiner*—Kee M Tung
*Assistant Examiner*—Robert Craddock
(74) *Attorney, Agent, or Firm*—Fish & Richardson P.C.

(57) ABSTRACT

In-context paint stroke characteristic adjustment, in which a first user input selecting a path of a paint stroke rendered on a display is received, an anchor point on the path is defined based on the first user input, and a characteristic adjustment control is rendered adjacent to the anchor point. A second user input is received via the characteristic adjustment control, and a characteristic of the paint stroke is adjusted at the anchor point based on the second user input.

63 Claims, 27 Drawing Sheets

100

IN-CONTEXT PAINT STROKE CHARACTERISTIC ADJUSTMENT

FIELD

The present disclosure generally relates to computer graphics, and at least one particular implementation relates to the in-context adjustment of a paint stroke characteristic.

BACKGROUND

Painters refer to the mark caused by the movement of a physical paint brush over a medium, such as a canvas, as a paint stroke or brush stroke. Similarly, graphics designers can use computer applications can create virtual paint strokes, defined by the movement of a virtual paint brush (or brush icon) along a path on a display. Graphic designers prefer using these virtual paint strokes instead of using straight lines, curves or other templated shapes, due to the visually appealing non-uniformity of the region or regions that can be defined by a single paint stroke.

Due to this non-uniformity, however, alteration of a paint stroke rendered on a display is oftentimes difficult, onerous and counterintuitive, and is always performed using a process that is non-analogous to the alternation of a physical paint stroke. For example, in many typical computer graphics applications, characteristics of a rendered paint stroke must be adjusted by selecting options on various nested menus, which may be distally disposed across the virtual desktop from the paint stroke itself.

SUMMARY

In accordance with one general implementation, a first user input selecting a path of a paint stroke rendered on a display is received, an anchor point on the path is defined based on the first user input, and a characteristic adjustment control is rendered adjacent to the anchor point. A second user input is received via the characteristic adjustment control, and a characteristic of the paint stroke is adjusted at the anchor point based on the second user input.

Implementations may include one or more of the following features. For example, the first user input may be a mouse down event on the path, and the second user input may be a mouse drag event. Alternatively, the first user input and/or the second user input may be keyboard keystrokes. The paint stroke characteristic may be a width characteristic of the paint stroke, a color characteristic of the paint stroke, a spacing characteristic of sub-elements of the paint stroke, a jitter characteristic of the sub-elements of the paint stroke, an opacity characteristic, an angle characteristic of the paint stroke, or a fall-off characteristic of the paint stroke. The characteristic adjustment control may include a first drag point handle aligned along an axis intersecting the anchor point and perpendicular to the path, and the second user input may further include a mouse drag event dragging the first drag point handle.

In additional examples, the characteristic adjustment control may include a second drag point handle aligned along the axis on an opposite side of the path than the first drag point handle, the first and second drag point handles being equidistant from the anchor point. A third user input selecting the anchor point may be received, and the anchor point may be deleted based on receiving the third user input. Rendering the characteristic adjustment control adjacent to the anchor point may further include rendering the characteristic adjustment control over the anchor point. The paint stroke may include a plurality of sub-elements. The paint stroke may be defined by a movement of a brush icon along the path.

In further examples, the paint stroke may be re-rendered based on the adjusted paint stroke characteristic, and the path may be rendered over the paint stroke. Adjusting the paint stroke characteristic at the anchor point may further include adjusting the paint stroke characteristic at the anchor point and an adjacent point adjacent to the anchor point, based on the second user input. Adjusting the paint stroke characteristic at the adjacent point is further based on a fall-off value. A third user input selecting the path may be received, a second anchor point may be defined based on the third user input, and a characteristic of the paint stroke may be adjusted at the second anchor point based on the second user input. Alternatively, a third user input may be received, and the anchor point may be translated along the path based on the third user input. The third user input may be a mouse drag event along the path or along an axis.

According to another general implementation, a computer program product is tangibly embodied in a machine-readable storage medium. The computer program product includes instructions that, when read by a machine, operate to cause a data processing apparatus to receive a first user input selecting a path of a paint stroke rendered on a display, define an anchor point on the path based on the first user input, and render a characteristic adjustment control adjacent to the anchor point. The computer program product also includes instructions that operate to cause a data processing apparatus to receive a second user input via the characteristic adjustment control, and adjust a characteristic of the paint stroke at the anchor point based on the second user input.

According to another general implementation, a device includes a display, an input device, and a processor. The display renders a paint stroke, and renders a characteristic adjustment control adjacent to an anchor point. The input device, which may be, for example, a mouse or a keyboard, receives a first user input selecting a path of the paint stroke, and receives a second user input via the characteristic adjustment control. The processor defines the anchor point on the path based on the first user input, and adjusts a characteristic of the paint stroke at the anchor point based on the second user input.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
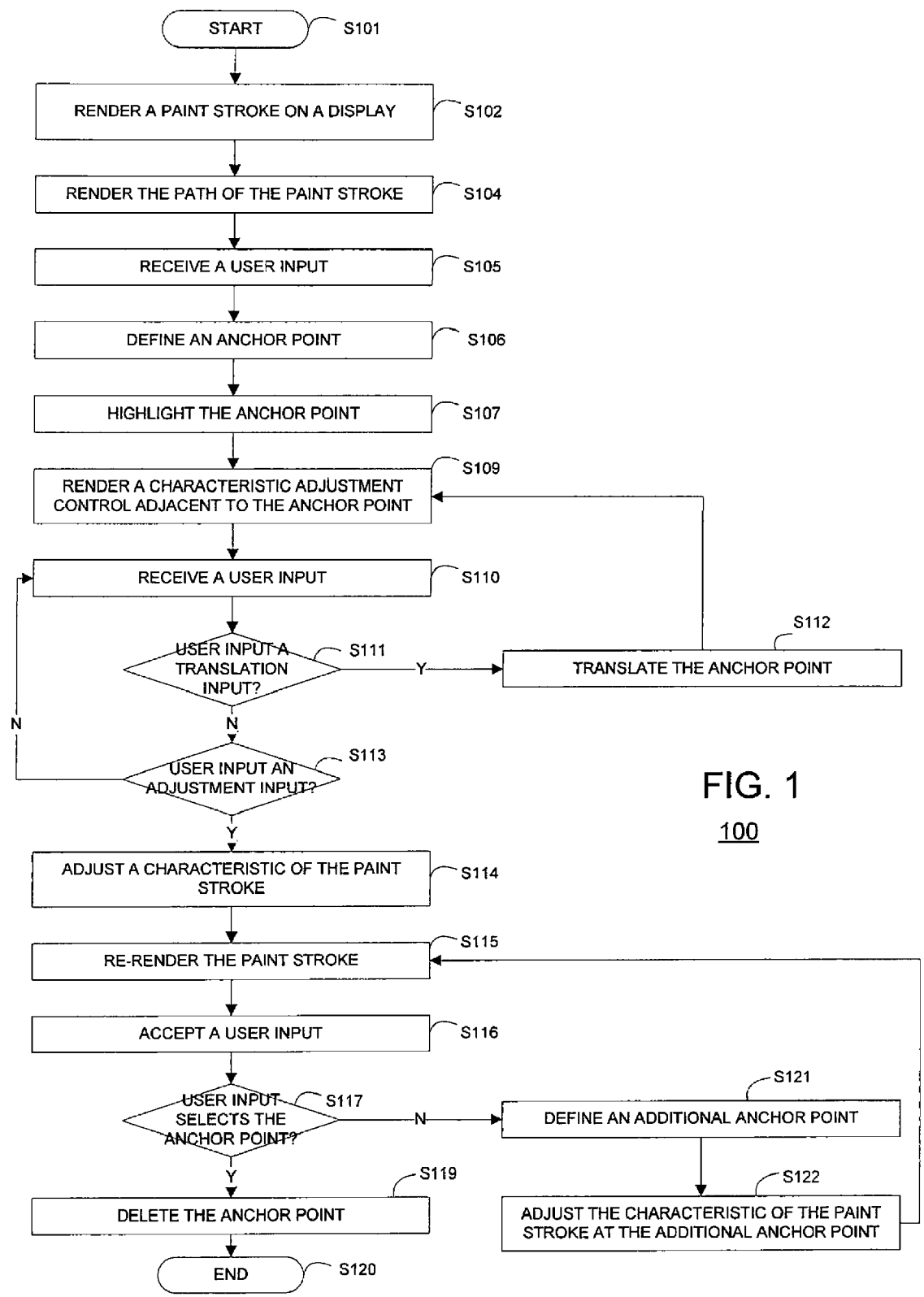
FIG. 1 is a flowchart illustrating a process for adjusting the characteristics of a paint stroke rendered on a display.

FIG. 1 is a flowchart illustrating a process 100 for adjusting the characteristics of a paint stroke rendered on a display.

Briefly, a first user input selecting a path of a paint stroke rendered on a display is received, an anchor point on the path is defined based on the first user input, and a characteristic adjustment control is rendered adjacent to the anchor point. A second user input is received via the characteristic adjustment control, and a characteristic of the paint stroke is adjusted at the anchor point based on the second user input.

Initially, the characteristic to be adjusted may be any characteristic that defines the overall look or effect of the paint stroke. Specific examples include, but are not limited to, a width characteristic of the paint stroke, a color characteristic of the paint stroke, a spacing characteristic of sub-elements of the paint stroke, a jitter (or spread) characteristic of the sub-elements of the paint stroke, an opacity characteristic, an angle characteristic of the paint stroke, a brush icon, or a fall-off characteristic.

Figure 2:
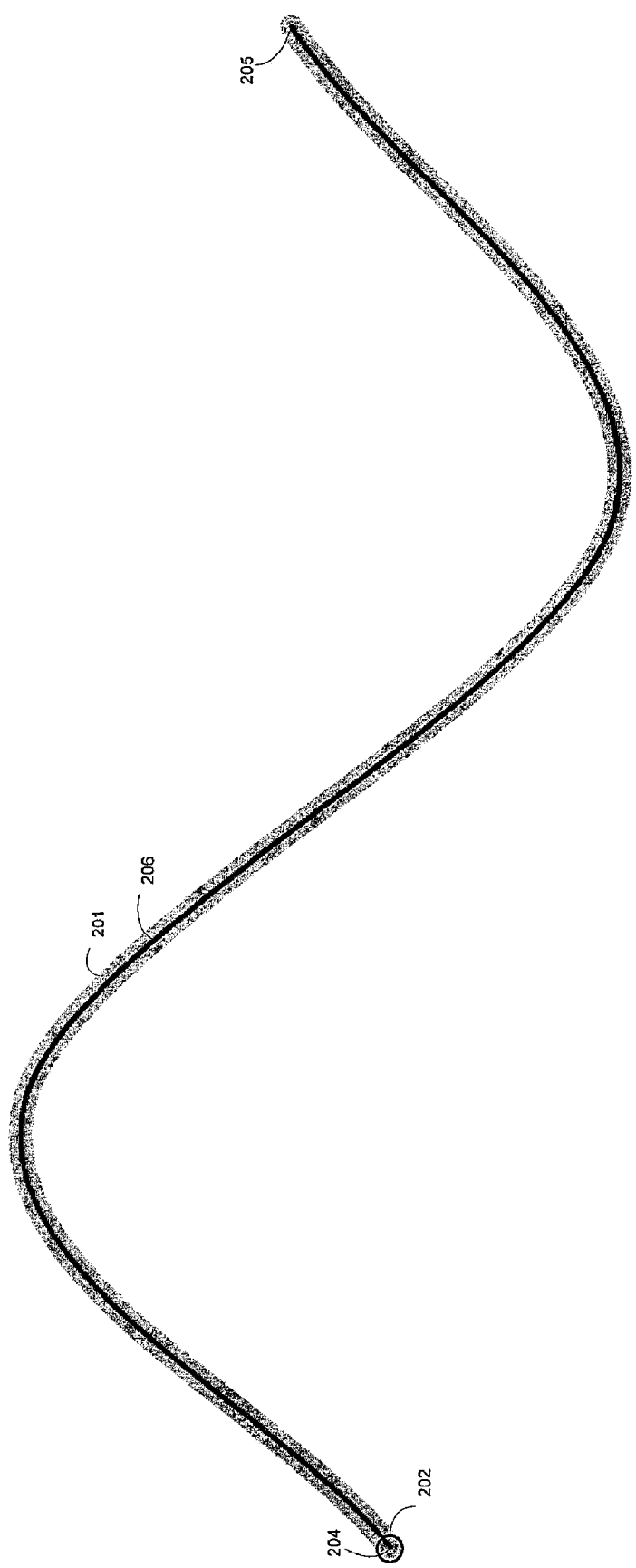
FIGS. 2 to 25 illustrate the in-context adjustment of exemplary paint strokes, in various stages of the adjustment.

In more detail, the process 100 begins (S101) with the rendering of a paint stroke on a display (S102). FIG. 2 illustrates one such rendered paint stroke 201, which is created by moving circular brush icon 202 from an origin point 204 to a destination point 205 on the display, along a path 206. The movement of the brush icon 202 is caused by a user inputting commands into an input device, such as a mouse, a keyboard, a touch screen device or other input device, where a processor maps these input commands a movement of a cursor, control or indicator on the display.

Using a mouse, for example, a single paint stroke may be created when the user clicks and holds down a mouse button (a mouse down event) and moves the mouse with the mouse button held down (a mouse drag event), then releases the mouse button at the desired destination point (a mouse up event). Using a touch screen device, a single paint stroke is created when the user touches the touch screen device (a finger down event), moves the finger across the screen (a finger drag event), and removes the finger from the screen (a finger up event).

The movement of a finger across a touch screen device display maps the path displayed on the screen, in a 1:1 relationship in two dimensions, such that a movement with the finger of one distance unit in any direction causes the cursor to also move one distance unit, creating a path that is one distance unit long. Due to scaling, acceleration and other factors, the movement of cursor on a display, caused by a mouse, keyboard, or joystick input across a physical desktop may not have a 1:1 relationship in two dimensions.

Although the exemplary paint stroke 201 is sinusoid-shaped, it can also be any other shape, as long as the paint stroke is defined by a movement of the brush icon along a continuous path. Other example paint strokes may include only a single point, may be exactly straight or curved, may form shapes such as polygons, circles or spirals, or could intersect, overlap and double-back on the path. In an alternate implementation, rendering a paint stroke does not include user input, but instead includes, for example, receiving an input which causes a paint stroke to be automatically rendered, or accessing a stored path.

If the user were to release the mouse button and re-click on the mouse button during the movement, thereby generating a discontinuity in the path, two paint strokes would be created. Although the adjustment of a characteristic of a paint stroke is described herein as being applied to a point on a path, the characteristic may also be applied to affect multiple paths of multiple paint strokes.

Figure 17:
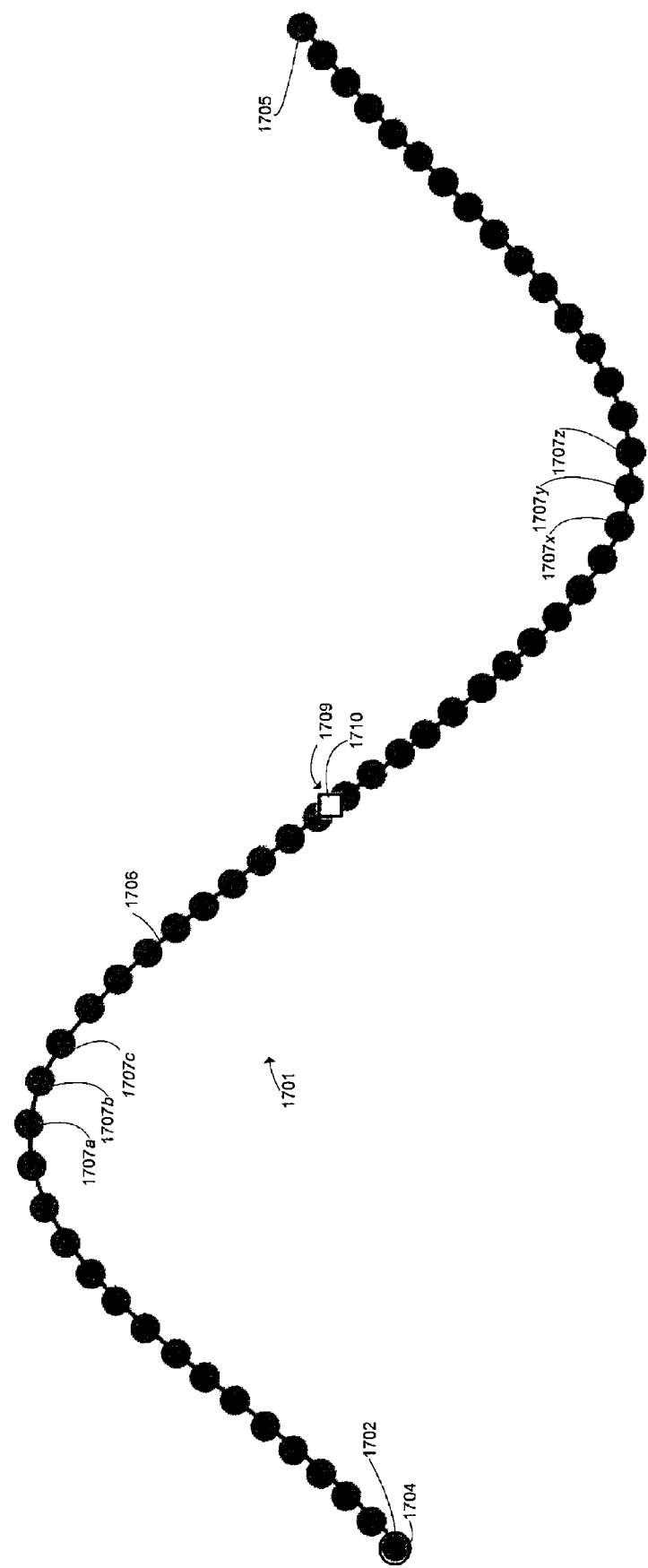
Figure 18:
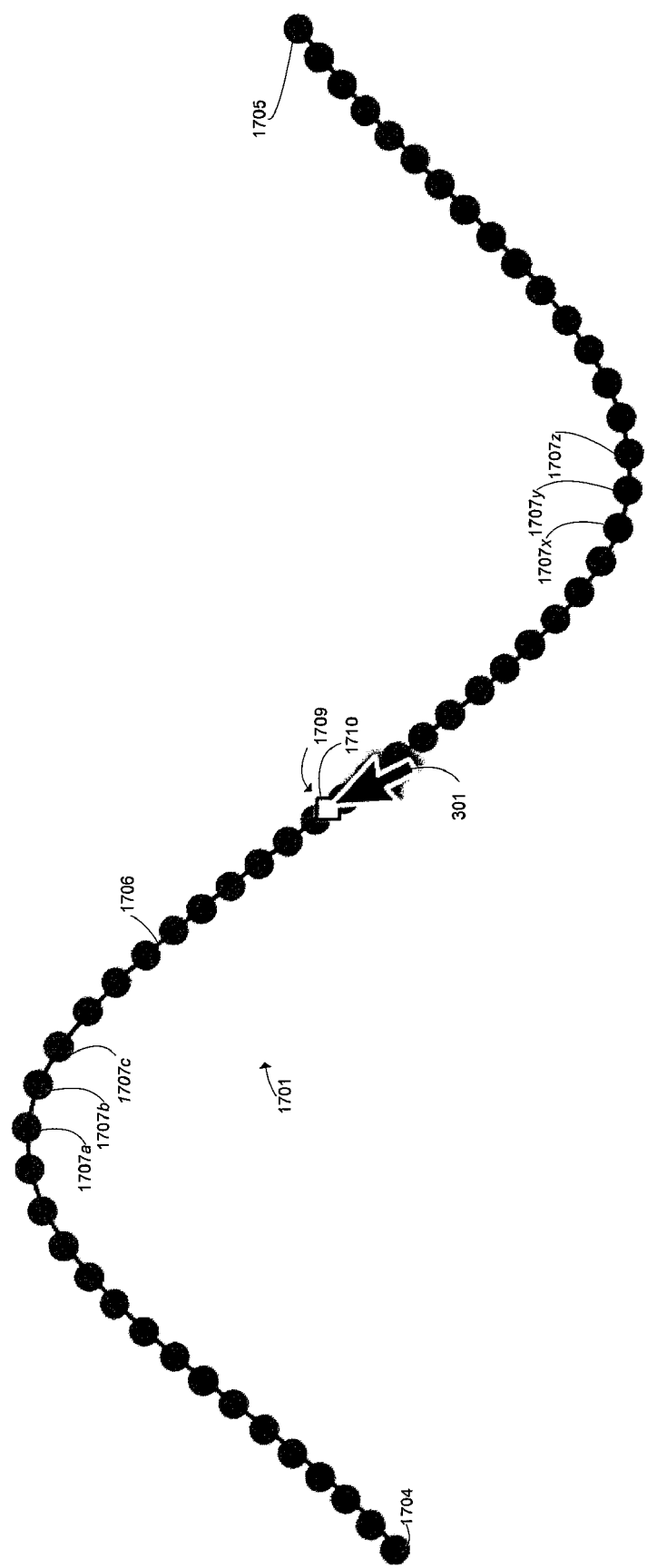

Although the paint stroke 201 is illustrated as a single, continuous region, it need not be. For example, and as shown in FIG. 17, a paint stroke can include sub-elements, representing a repeating series of patterns corresponding to the brush icon, generally aligned along the path. In that case, the paint stroke is collectively defined by the sub-elements. These sub-elements may be continuous, such that they overlap at each position on the path, or they may be discontinuous, such that positions exist along the path for which no sub-region overlaps. The creation of a path which discontinuous sub-elements is distinguishable from the creation of discontinuous paths in one movement of an input device, which causes the creation of two or more separate paint strokes.

Figure 19:
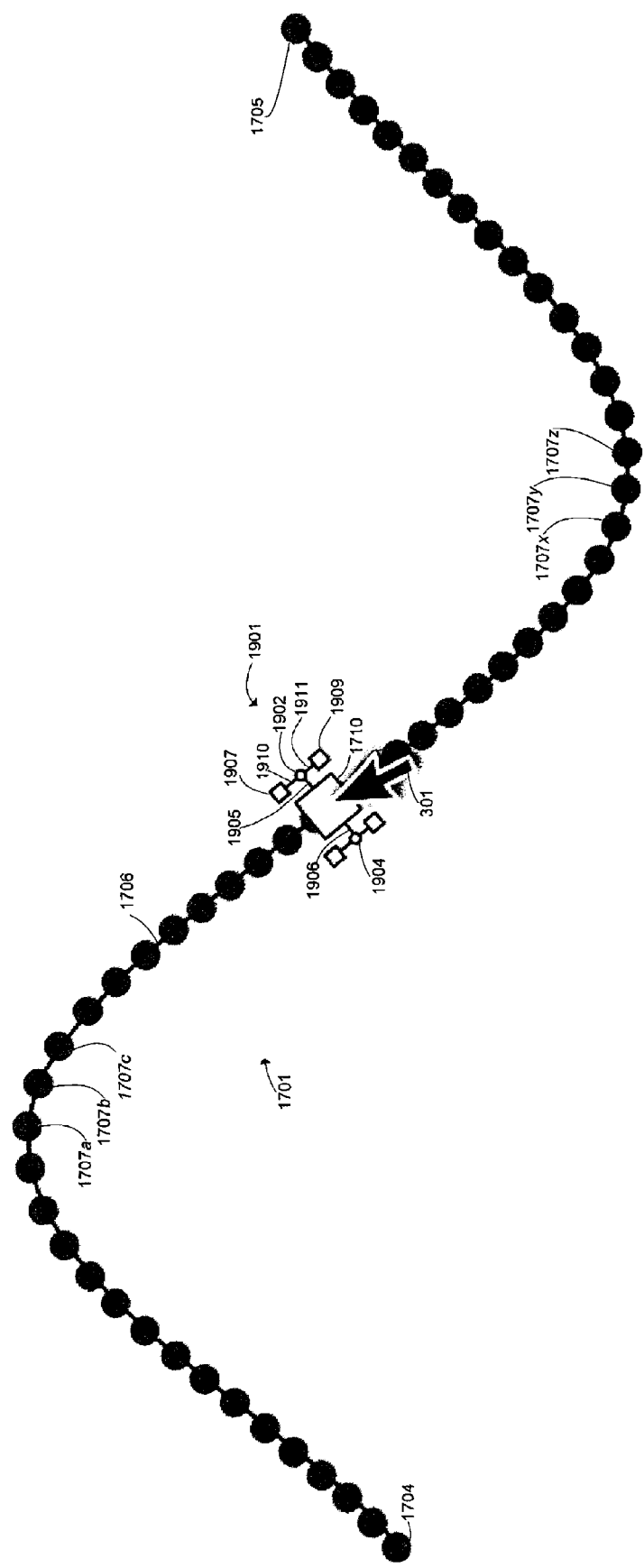
Figure 22:
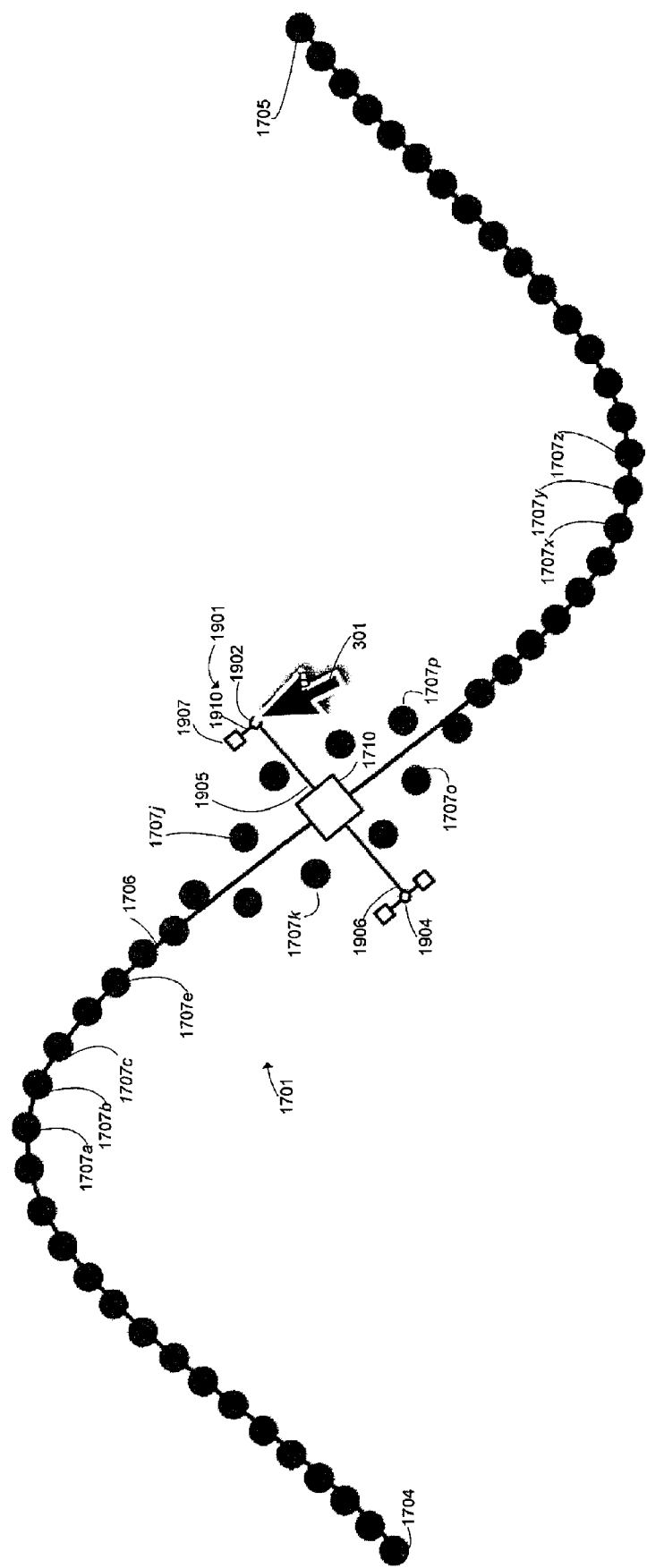

A jitter or spread characteristic is associated with the sub-elements to randomize or offset the position of sub-elements with respect to the path, where jitter represents an alternating offset or deviation of the sub-elements from the path. By way of example, FIG. 19 illustrates a paint stroke including sub-elements with little or no jitter, and FIG. 22 illustrates the same paint stroke with increased jitter. Jitter is used by a graphic designer to create complex visual features, such as smoke or cloud trails, flames, or other designs which benefit from a pseudo-randomization of sub-elements. Further randomization can be created, for example, by utilizing a brush icon with variable edges.

The path 206 of the paint stroke 201 may be rendered over the paint stroke 201 (S104), to make the path 206 visible (or more visible) to the user. Such rendering occurs, for example, by placing a visual layer depicting the path 206 nearer to the user than (or above) a visual layer depicting the paint stroke 201, by adjusting a transparency characteristic of the paint stroke 201 such that the path 206 becomes visible to the user, by highlighting the path 206, or by using other approaches. By rendering the path 206 over the paint stroke, it is easier for the user to locate and select a portion of the path 206 for adjustment of the paint stroke 201. In an alternate implementation, such as where the paint stroke 201 is narrow, or where the position of the path 206 may be easily implied, or where it is not intended that the user select the path 206, the path 206 is not rendered, or the path is rendered under the paint stroke 201.

Figure 3:
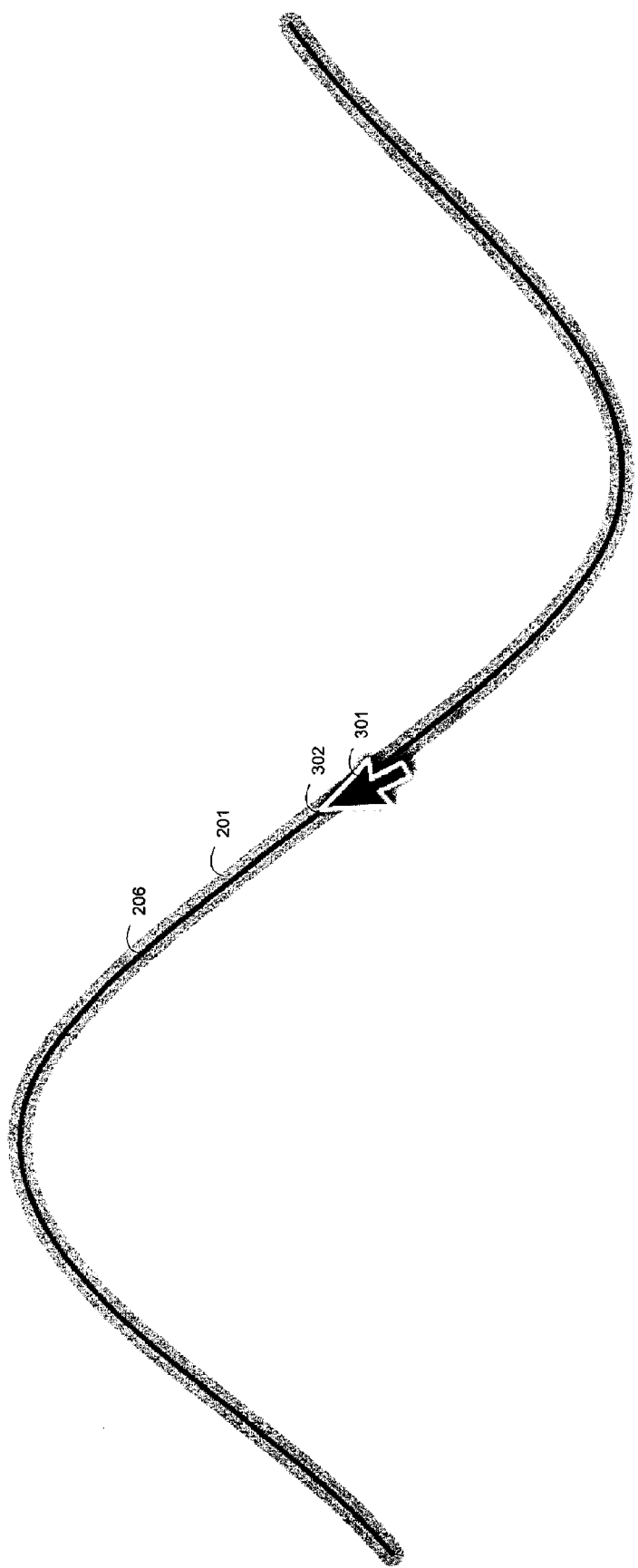

A user input selecting the path 206 of a paint stroke 201 is received (S105). As illustrated in FIG. 3, selection of the path 206 occurs when, for example, a user moves a cursor 301 over a point 302 on the path 206, and selects the point 302 by way of a mouse click event (i.e. both a mouse down event and a mouse up event). The user selects the path 206 to indicate that an adjustment of a characteristic of the paint stroke 201 is to be performed. In a further example implementation, if the path 206 is not selected, the point nearest to the position of the user input is automatically selected, or the user is prompted to re-input.

The selection of the point 302 on the path 206 may also occur by selecting and holding down a mouse button (i.e. a mouse down event) alone, by touching the path 206 using a touch screen device, by selecting the path and scrolling to a position, by using a keyboard keystroke, by voice input, by accessing a stored position, or by utilizing any other input approach. The user input selecting the path 206 may also be a double-clicking event, or an option-clicking event on an area of interest on the paint stroke 201.

The selected point may be an anchor point, which is the location along the path where the user intends characteristic adjustments to the paint stroke 201 be focused. The user is also provided with the option of translating the anchor point from a previously-selected location on the, by way of a translation maneuver. A translation maneuver could be used, for example, when the desired anchor point is obscured by another graphical element, or where, upon selection of the anchor point, the user realizes that a different location was intended or desired.

Figure 4:
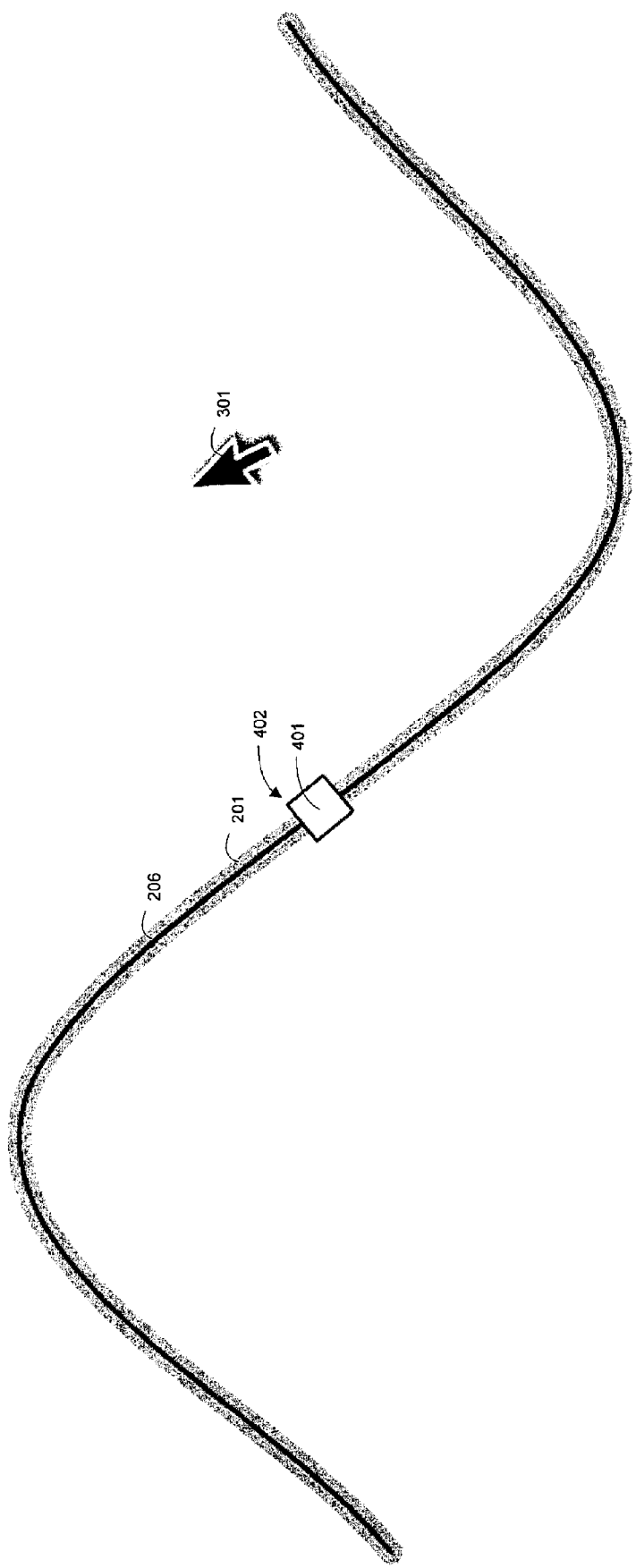

As illustrated in FIG. 4, based on the user selecting the path 206 of the paint stroke 201 (S105), an anchor point 401 on the path 206 is defined (S106). While the path 206 includes various points such as the point 302 between the origin point 204 and the destination point 205, an anchor point 401 is a point that has been selected by the user as a set position, or anchor, as a focus for the adjustment of the characteristics of the paint stroke 201. Put another way, upon receipt of an input adjusting the characteristics of the paint stroke 201, the characteristic adjustment is applied to the paint stroke 201 at the anchor point 401, although other points adjacent to the anchor point may also be affected. Definition of the anchor point 401 may include storage of the absolute or relative position of the anchor point 401.

The anchor point 401 may be highlighted (S107) to increase the visibility of the anchor point 401, and to provide a visual reference of the anchor point 401 with respect to other graphical elements. Highlighting may refer to the changing the color of the anchor point 401 with respect to the path 206 or the paint stroke 201, by superimposing a symbol or marker 402 to make the anchor point 401 more easily identifiable, or by using other approaches. In FIG. 4, for example, the anchor point 401 is highlighted by displaying a square-shaped marker 402 over the position defined as the anchor point 401. As depicted, the shaped marker 402 may obscure the path 206 and/or the paint stroke 201. If more than one marker is provided on a single path, for example where multiple anchor points are defined, the markers may be highlighted or otherwise distinguished using different shapes or colors. In alternate implementations, other shapes may also be used to highlight an anchor point, highlighting may not occur, or highlighting may occur upon the satisfaction of certain preconditions or during particular time periods.

Figure 5:
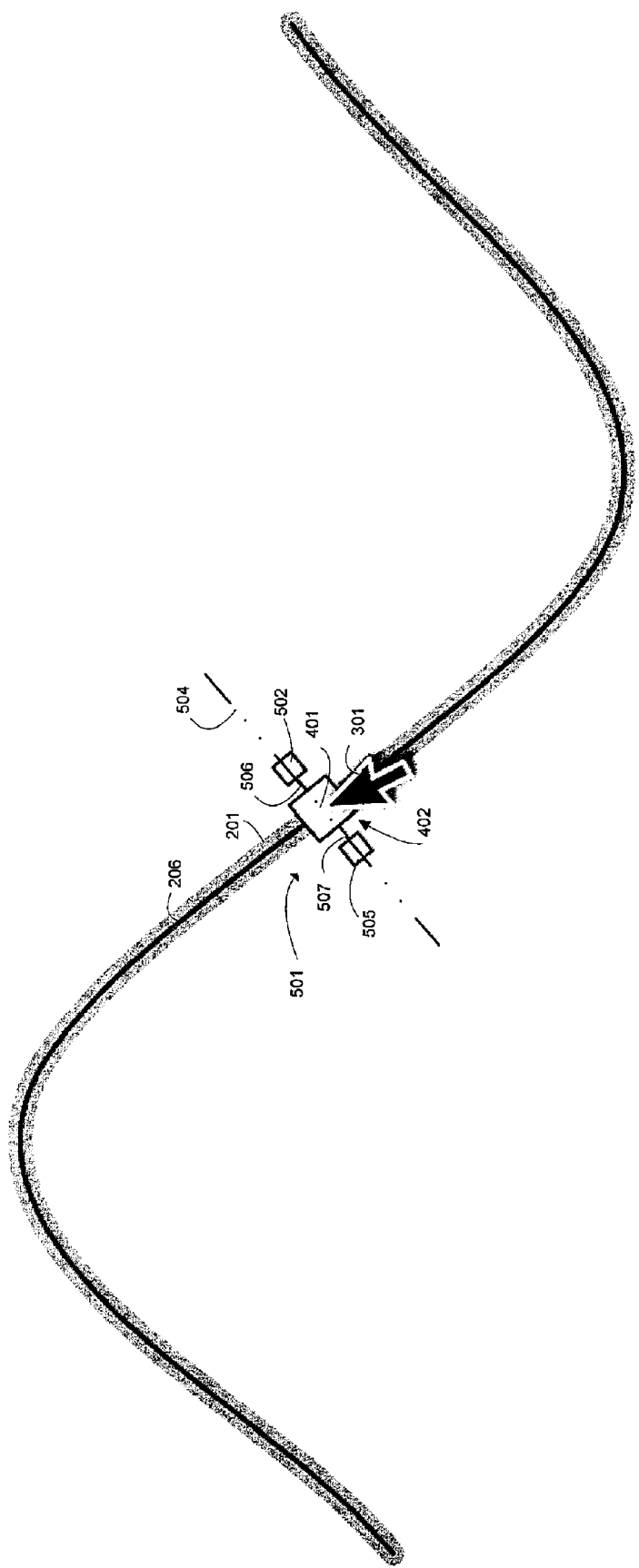

A characteristic adjustment control 501 is rendered adjacent to the anchor point 401 (S109). In FIG. 5, the characteristic adjustment control 501 includes a first drag point handle 502 aligned along an axis 504 intersecting the anchor point 401 and perpendicular to the path 206 at the anchor point 401. The characteristic adjustment control 501 also includes a second drag point handle 505 aligned along the axis 504, on an opposite side of the path 206 than the first drag point handle 502. The first drag point handle 502 and the second drag point handle 505 are equidistant from the anchor point 401, and are connected to the marker 402 by adjustable connecting lines 506 and 507, respectively, which lengthen and contract to contact the shaped marker 501 and the drag point handles as the drag point handles are adjusted. By allowing the user to quickly modify the characteristic of the paint stroke by way of a control rendered adjacent to the location of adjustment, the character adjustment is deemed in-context.

In other example implementations, different characteristic adjustment controls may be used. For example, the characteristic adjustment control 501 may have only one drag point handle, or may have four or more drag point handles or sub-handles. The drag point handles may be aligned on other axis as well, such as an axis parallel or tangential to the path, or offset by 45° instead of a 90°. Additionally, while the paint stroke characteristic adjustment control 501 is shown as being rendered over the anchor point 401, in other example implementations the characteristic adjustment control is rendered at a location near to, but not over the anchor point 401, or is dynamically adjusted to be rendered adjacent to the anchor point as the drag point handles are adjusted.

A user input is received via the characteristic adjustment control (S110). The user input may be, for example a mouse drag event, in which the user moves a mouse, a keystroke input, a touch screen device input, a joystick input, a verbal input, or another input. The user input may be indicative of a translation input, by which the user intends to translate the anchor point 401 to another point on the path 206, or the user input may be indicative of an adjustment input, by which the user intends to adjust a characteristic of the paint stroke via the characteristic adjustment control 501. For example, adjustment criteria may define that a mouse drag event input along axis 504 or a mouse down event on the first drag point handle 502 be interpreted as a characteristic adjustment control, translation criteria may define that a mouse drag input along the path or along an X-axis of a mouse, or a keyboard keystroke, be interpreted as a translation input.

In the case of a mouse or joystick input device, the reception of a user input via the characteristic adjustment control may refer the selection and adjustment of a portion of the characteristic adjustment control with a cursor. In the case of a keyboard input device, the reception of a user input via the characteristic adjustment control may refer to the selection of a portion of the characteristic adjustment control, such as by using a keyboard shortcut or the TAB key, the display and entry of a desired characteristic value, such as by numerical entry or arrow input, and updating of the position of the selected portion based on the entered value. In any case, the characteristic adjustment control refreshes to adjust the position of the selected portion based on the input, to provide the user with real-time or near real-time feedback of the magnitude of the adjustment.

Figure 6:
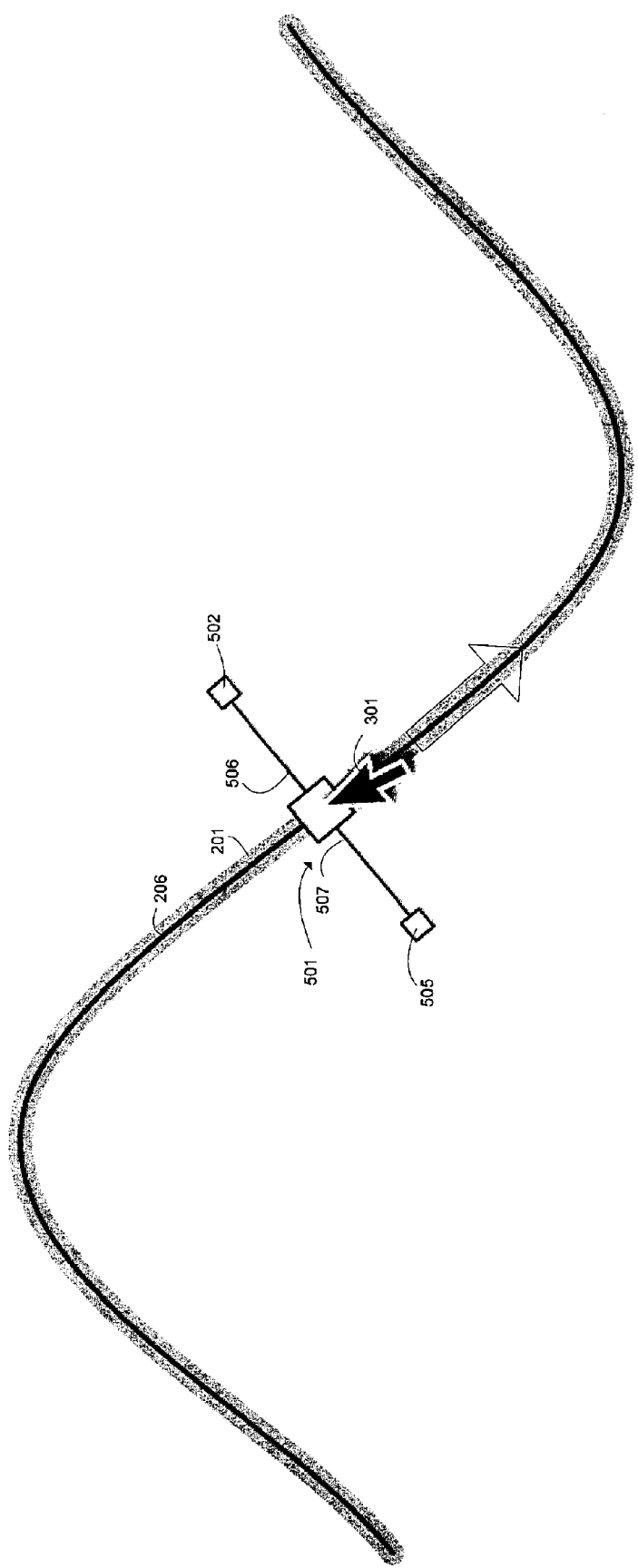
Figure 7:
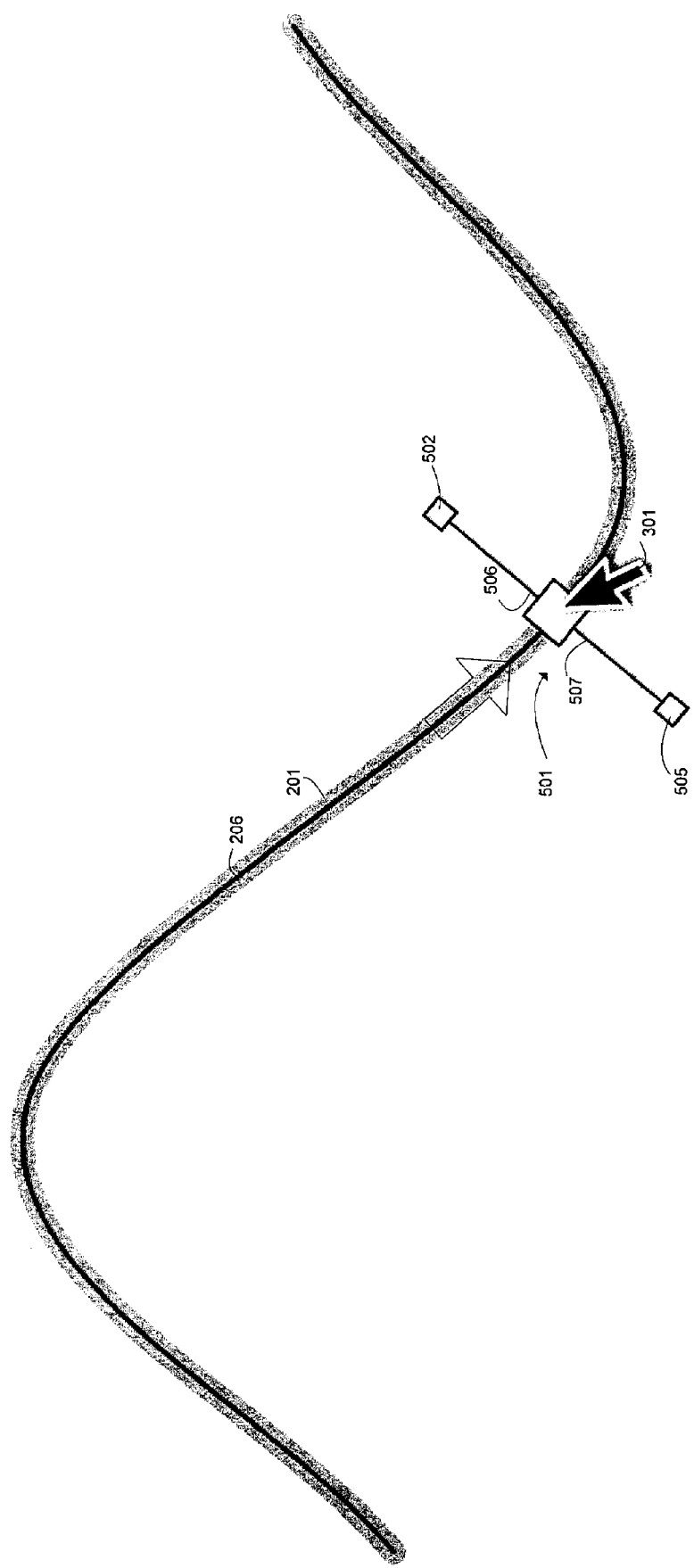
Figure 8:
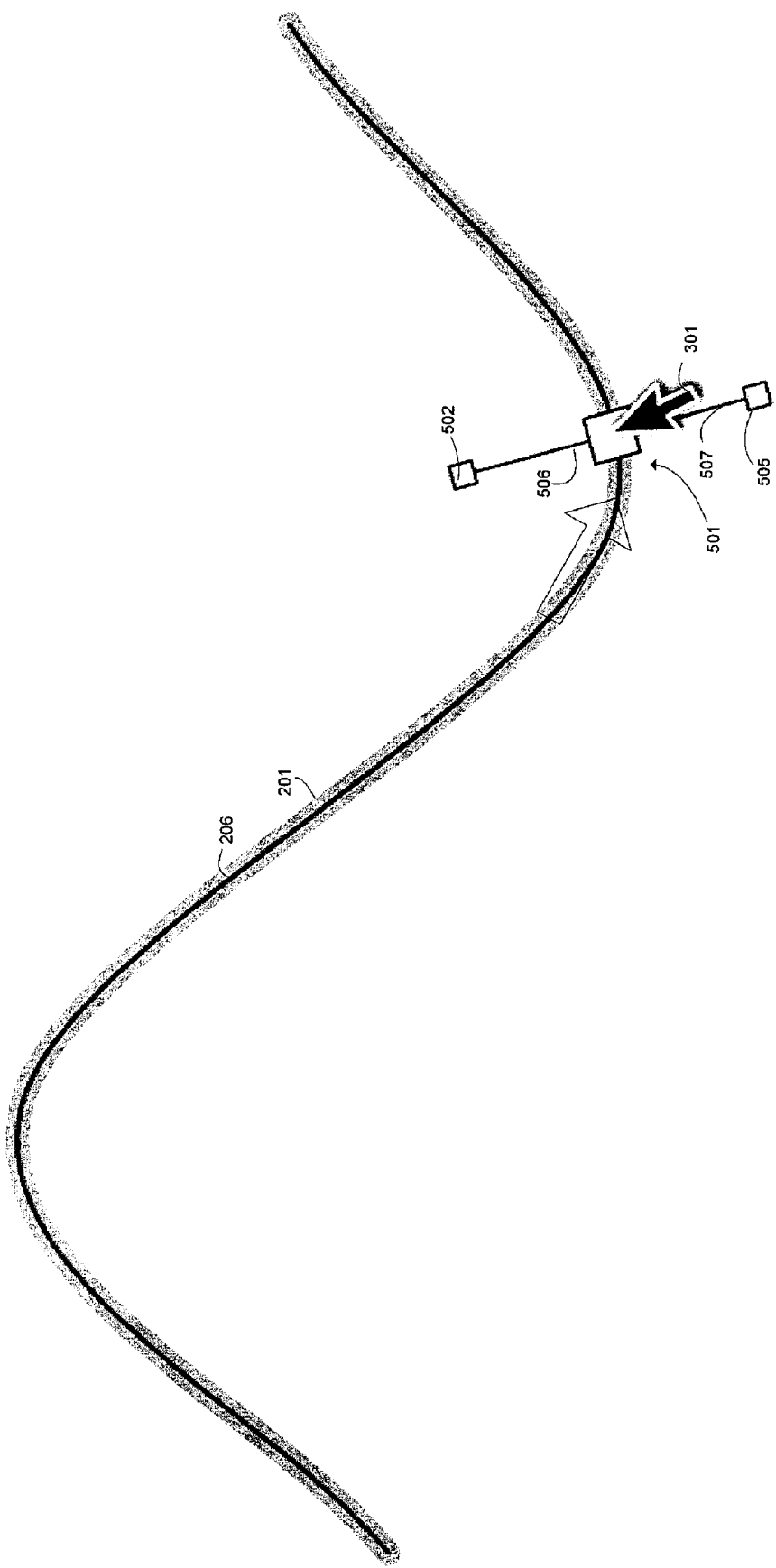

If the user input (received at S110) is determined to be a translation input (S111), the anchor point is translated along path based on that user input (S112). FIGS. 6 to 8 illustrate the translation of the anchor point 401, which occurs when a user drags the cursor 301 along the path 206. The final position of the translated anchor point 401 depends upon the user input. For example, the distance of translation may be specified by a keystroke input, the final position can be entered by touching the final position using a touch screen device, or the user can scroll the characteristic adjustment 501 to the desired position using a mouse drag event. Once the anchor point has been translated (S112), the characteristic adjustment control is again rendered adjacent to the translated anchor point (S109).

In various implementations, the translation input may include a movement of the cursor along the path, or along an axis (such as the X-axis) of a mouse. If the path is a spiral-shaped path, it may be onerous to expect the user to move the cursor 301 along that path, especially if inadvertent deviation from the path would reset the position of translation to the original anchor point. Thus, translation of the anchor point along a spiral-shaped path may be better realized by the movement of the input device along a predetermined axis, such as an X-axis.

Alternatively, however, such as where the path is generally oriented along the Y-axis, it is more intuitive for a user to move the cursor 301 along the path than along a predetermined axis that is not the Y-axis of the input device. Thus, translation of the anchor point may be better realized by a path-wise movement. Since both approaches work well for different shape types, the mapping of translation input from a user input movement may be automatically performed based on the size, shape or orientation of the path 206, to thereby make the entry of the translation input easier and more intuitive for the user.

If the user input is not determined to be a translation input (S111), it is determined whether the user input is an adjustment input (S113). If the user input is determined to not be a translation input (S111) or an adjustment input (S113), an error may have occurred and the user is again prompted to enter the input again (S110). If the user input is determined to be an adjustment input (S110), a characteristic of the paint stroke is adjusted at the anchor point based on the user input (S114), and the paint stroke is re-rendered based on the adjusted paint stroke characteristic (S115). After having drawn a paint stroke, the user can simply click the point along the stroke that they wish to alter, causing an on-screen control to appear. The on-screen control allows the user to modulate the intensity of the characteristic by pulling a control handle, which updates in real-time or near real-time, to display the result on the stroke as the control is adjusted.

Figure 9:
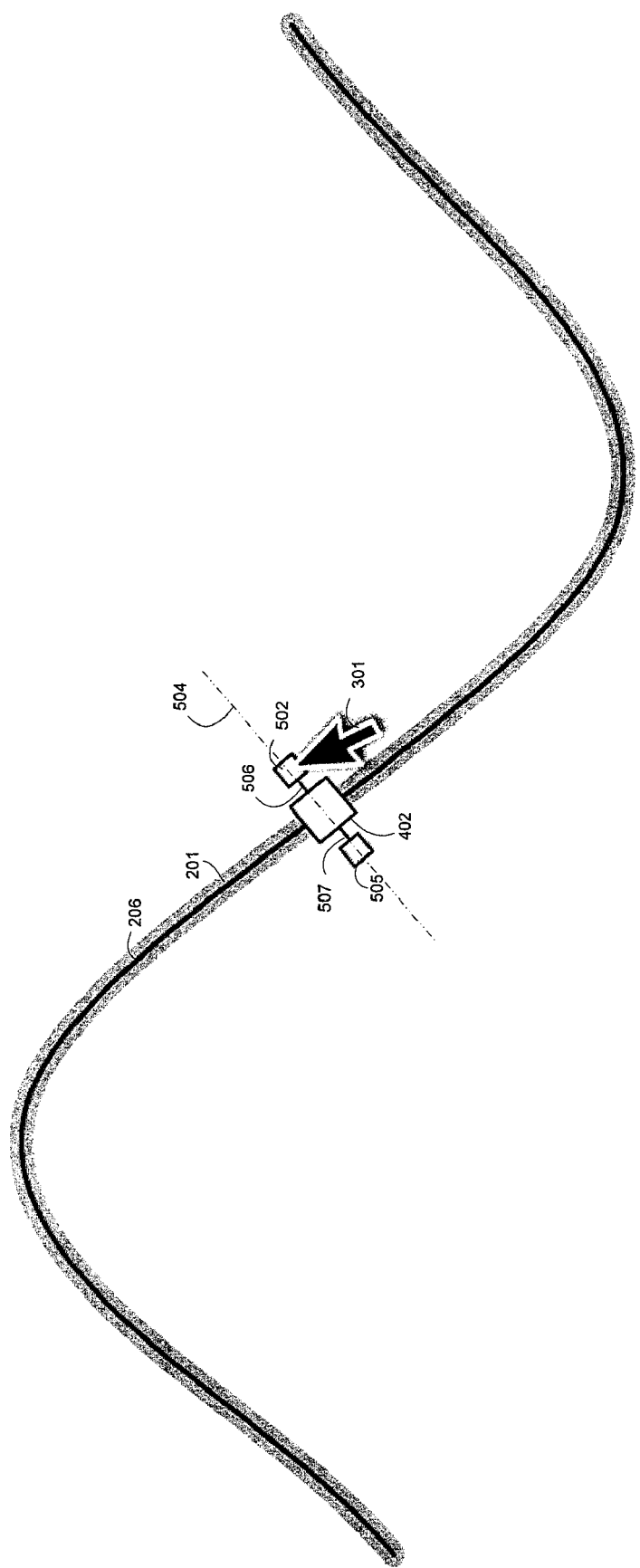
Figure 10:
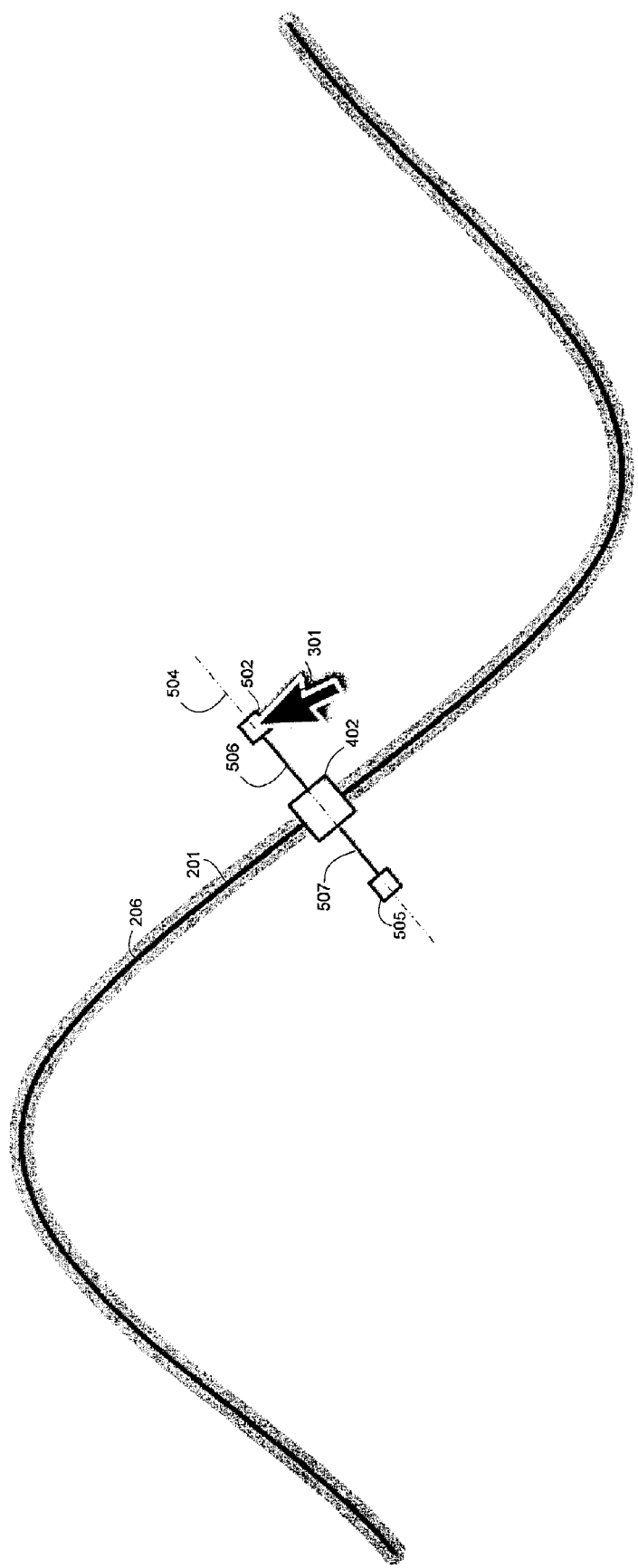
Figure 11:
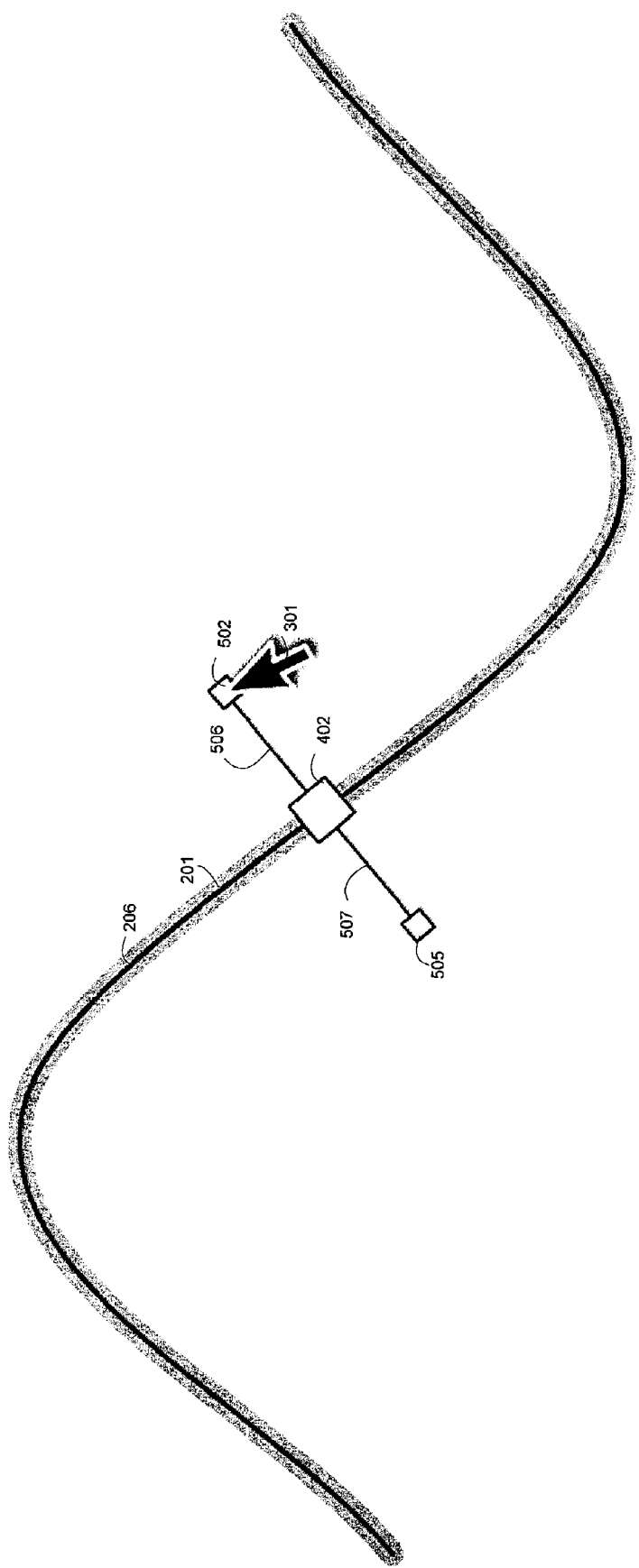

FIGS. 9 to 12 illustrate the input of an adjustment input, in which cursor 301 selects the first drag point handle 502 with a mouse down event or a keyboard keystroke, and drags the first drag point handle 502 along the axis 504, or along an arbitrary axis of the input device. As illustrated in FIG. 11, the user can select a desired adjustment, for example by releasing the drag point handle 502 with mouse-up event. Once the anchor point 401 is defined and highlighted and the drag point handles are made visible, the user is enabled to drag the drag point handles to modify the characteristic of the paint stroke 201. The adjustment of the drag point handles may also be enabled by dragging a mouse immediately upon selecting the path (S105). By re-rendering the paint stroke in real-time or near real-time, the user receives timely feedback as to their edits.

The magnitude of the characteristic adjustment is determined by the change in position of the drag point handles. For instance, for a distance characteristic adjustment such as a jitter characteristic, a spacing characteristic, or a width characteristic, a movement of the drag point handles of one distance unit may map to an absolute or relative change of one distance unit in the distance characteristic, or a scaling factor may be applied to reduce or amplify the effect of the movement. In an example implementation in which the distance between the drag point handles 502 and 505 and the anchor point 401 are not automatically made equidistant, the adjustment of the first drag point handle 502 may cause the adjustment of a first characteristic, and the adjustment of the second drag point handle 505 may cause the adjustment of a second characteristic.

Alternatively, the magnitude of the characteristic adjustment may be determined by a change in length of the connecting lines 506 or 507, by the speed in which the drag point handles are moved, or by the relative position of the drag point handles before and after the movement. For example, if the connecting line 506 is one distance unit long before the adjustment and four distance units long after the adjustment, the characteristic adjustment may be a factor-of-three characteristic adjustment, based on the absolute change in distance, or a factor-of-four characteristic adjustment, based on the relative change in distance. Distances between other components of the characteristic adjustment control 501, such as a distance between drag point handles, a distance between the drag point handle and the anchor point 401, a total length of the connecting lines, or other distances may be used as the basis for the magnitude adjustment.

Adjusting the paint stroke characteristic at the anchor point 401 may further include adjusting the paint stroke characteristic at the anchor point 501 and at least one adjacent point adjacent to the anchor point based on the user input (received at S110). For instance, a user may wish to alter the width of a paint stroke at a portion of the paint stroke centered around the anchor point 401. In this case, and based on a fall-off value, the characteristic adjustment may be wholly or partially applied to the paint stroke at points adjacent to the anchor point 401. The fall-off value allows a user to select the rate at which a characteristic change is ramped up, or blended with surrounding points. For example, a high fall-off value may manifest itself as a drastic change in the characteristic, affecting points very near to the anchor point 401, while a small fall-off value may manifest itself as an insubstantial change in the characteristic, affecting points distal to the anchor point 401. A user may also wish to change a characteristic at the location of the anchor point 401 alone, in which case the fall-off value is not used.

Figure 12:
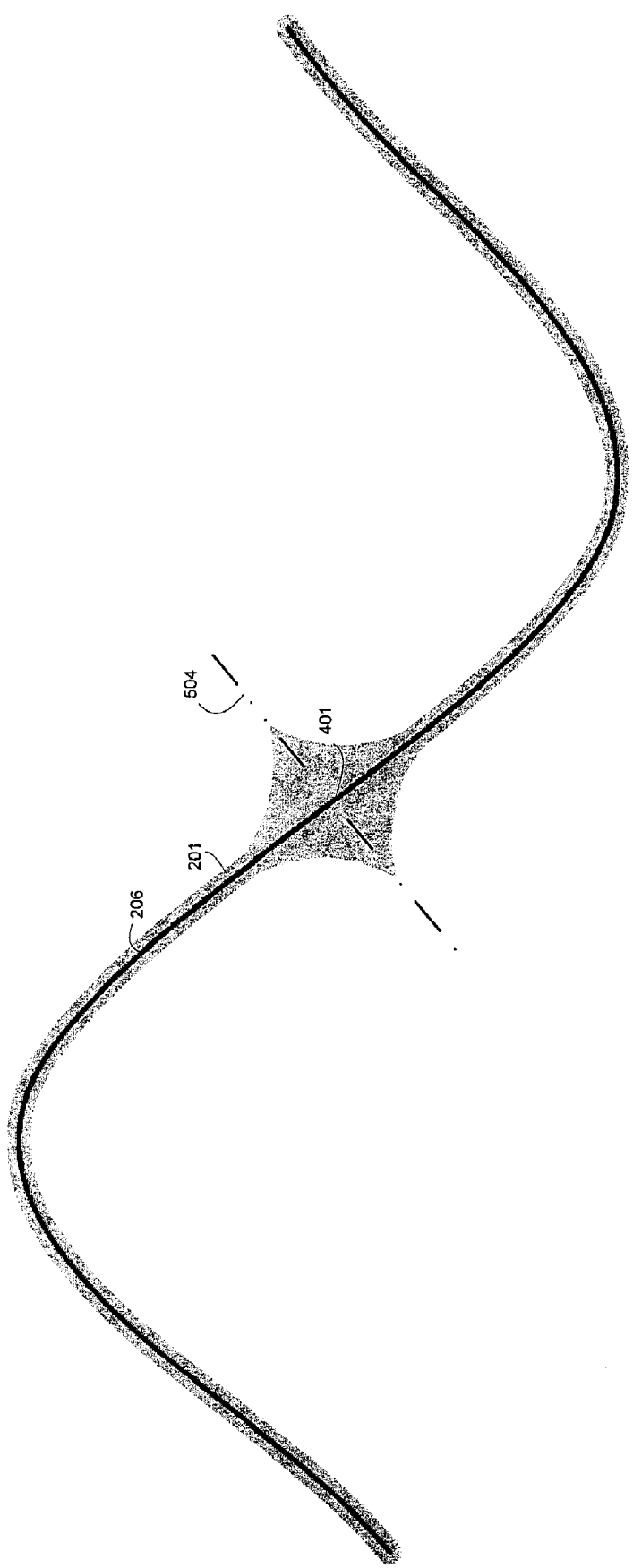

FIG. 12 illustrates an example of the effect of adjusting the first drag point handle 502 as shown in FIGS. 9 to 11, where the adjusted characteristic is a width characteristic. Although the width adjustment is greatest on the axis 401 intersecting the anchor point 401, the width adjustment also affects points adjacent to the anchor point. Although the fall-off of the width adjustment in FIG. 12 is sharp, this fall-off could be adjusted such that the width adjustment is more gradual along the length of the paint stroke 201.

Since each of the characteristics assist to defines the look of the paint stroke, direct adjustment via a characteristic adjustment control allows the user to use a creative process, rather than an iterative, menu-driven process to alter the paint stroke. This approach realizes many of the advantages of the digital medium, and allows the user to have an experience that is much closer to the adjustment of a physical paint stroke. Since the characteristics of each paint stroke are immutable, and since other editing processes are so tedious, the user no longer has to redraw the paint stroke order to conform the stroke to an original creative intent. Instead, the user is permitted to directly adjust characteristics of a paint stroke properties on screen and in-context after the stroke has been drawn, in an efficient and intuitive manor.

A user input may be received (S116). If the user input (received at S116) selects the anchor point 401 (S117), the anchor point 401 may be deleted (S119), thereby ending the process 100 (S120). The user input (at S117) may be a combination of a mouse down event on the anchor point 401 to select the anchor point 401 and a depression of the DELETE key on a keypad.

If the user input (received at S117) selects a different point on the path 206, an additional anchor point is defined on the path (S121), and a characteristic of the paint stroke is adjusted at the additional anchor point based on the prior user input (received at S110). The ability to select and define additional anchor points after the earlier adjustment of an anchor point effectuates a cut-and-paste functionality, in which a prior anchor point characteristic adjustment is repeated for different anchor points.

Figure 13:
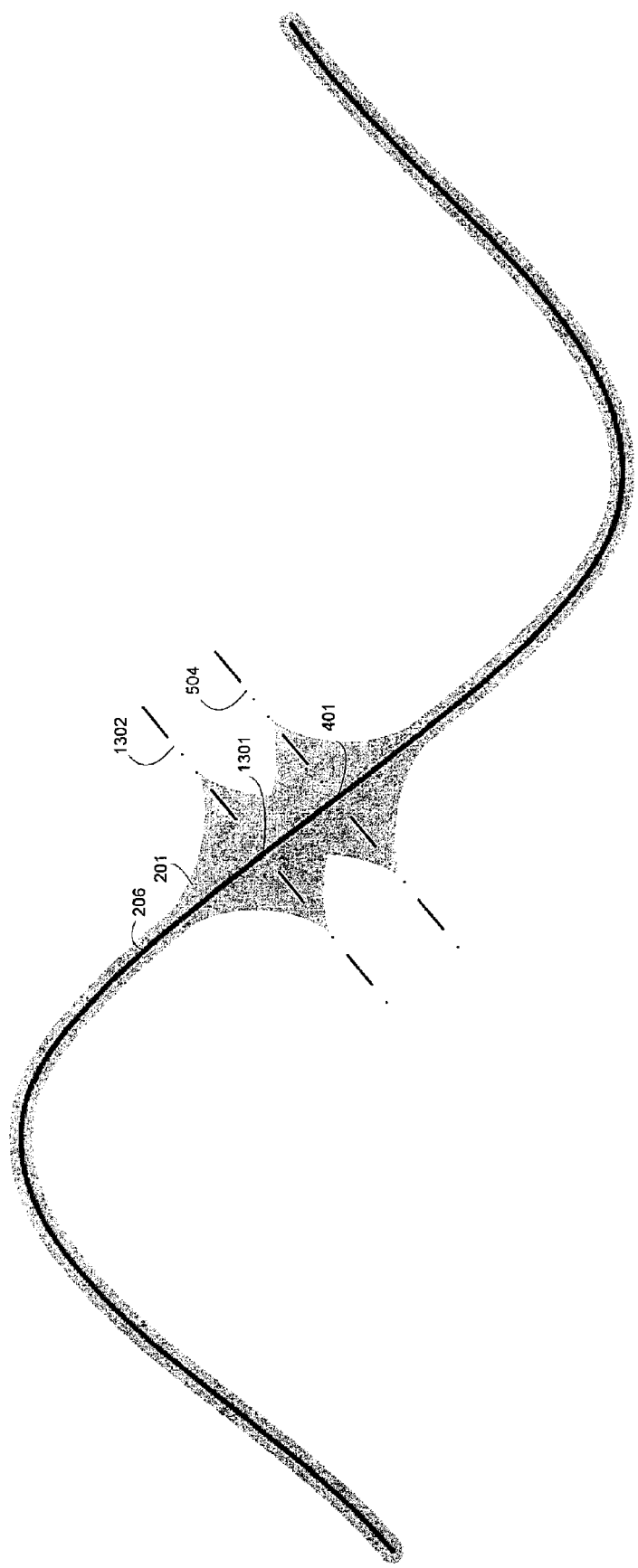

Taking the FIG. 12 example characteristic adjustment on step further, FIG. 13 illustrates the adjustment of the width characteristic of an additional anchor point based on the prior user input (received at S110). Specifically, if the user input received (at S116) selects a new anchor point 1301, the user can apply the same width characteristic adjustment applied in FIG. 12, along axis 1302. Although axis 1302 appears parallel to axis 502, axis 1302 is actually perpendicular to the path 206 at the additional anchor point 1302, and not necessarily at the anchor point 401. Such a cut-and-paste type adjustment could be repeated for other additional anchor points as well.

Although user input is generally described above in the context of a series of mouse events, in other example implementations, key-based input is used to adjust anchor points. With an anchor point defined, the left and right keys could provide a nudge-like behavior to translate the anchor point. Furthermore, the up and down keys could be used to adjust the characteristic of the paint stroke at the anchor point. Using key-based input, accelerators may be used when translating the anchor point along the path, to allow fine, precise control of the location of the anchor point on the path 206.

Additionally, although the process 100 refers to different user inputs, these user inputs may be defined according to desired user input schemes. For example, a traditional user input scheme may be based on a user separately selecting (via separate mouse clicks) the anchor point, the drag point handle start position, and the drag point handle end position. Another, streamlined user input approach may allow the user to select the anchor point by a mouse down event, automatically select the drag point handle start position, and select the drag point handle end position by a mouse up event. Or other custom schemes may also be used. Table 1, below, illustrates some of the differences between the traditional and streamlined approaches.

TABLE 1

| Event | Traditional Input Scheme | Streamlined Input Scheme |
| --- | --- | --- |
| Select Anchor Point (S105) | Mouse down event + mouse up event | Mouse down event |
| Translation Input Criteria (S111) | Mouse down event on marker over an anchor point | Motion along path |
| Translation Input (S112) | Mouse down event on marker + mouse drag event + mouse up event | Mouse drag event + mouse up event |
| Adjustment Input Criteria (S113) | Mouse down event on drag point handle | Motion along axis perpendicular to path at anchor point |
| Adjustment Input (S114) | Mouse down event on drag point handle + mouse drag event + mouse up event | Mouse drag event + mouse up event |

Using the streamlined input scheme, the mousing experience is brief, but forthright and responsive. Specifically, the user could select both the anchor point and the intensity all in one continuous mousing stream. The point could thus be defined upon the occurrence of a mouse down event, the intensity could be varied by way of a mouse drag event, and the characteristic adjustment would be registered or completed upon the occurrence of a mouse up event. Further alterations to the intensity characteristic could be applied by selecting and dragging the handle in a separate mousing steam, using a mouse-down event and a mouse drag event, to further refine the characteristic value.

Figure 14:
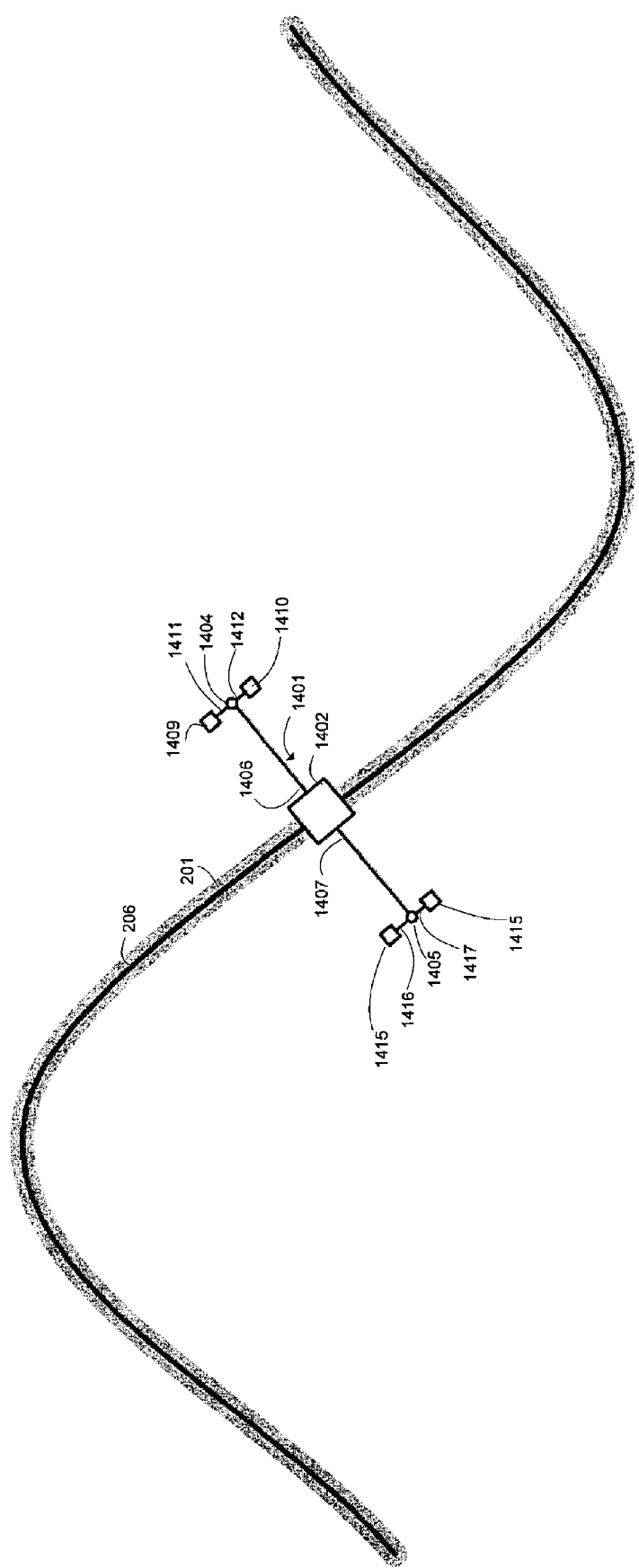
Figure 15:
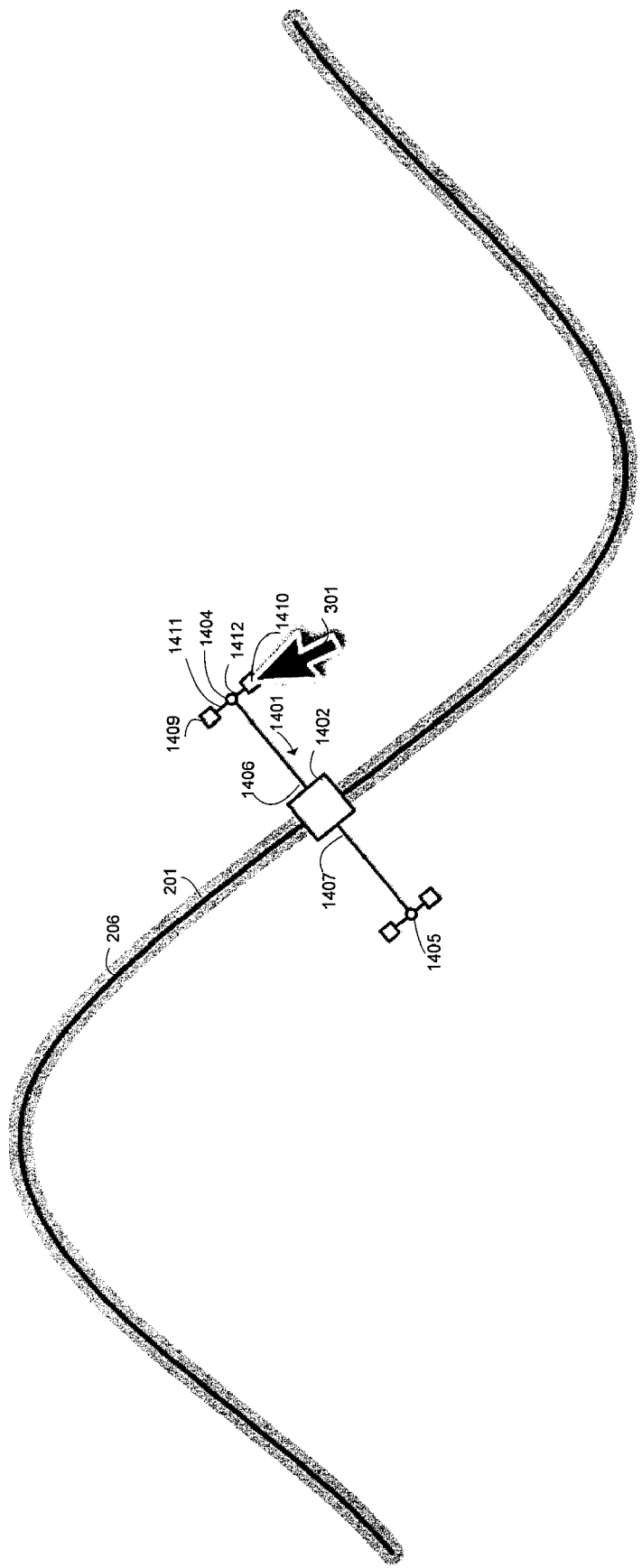
Figure 16:
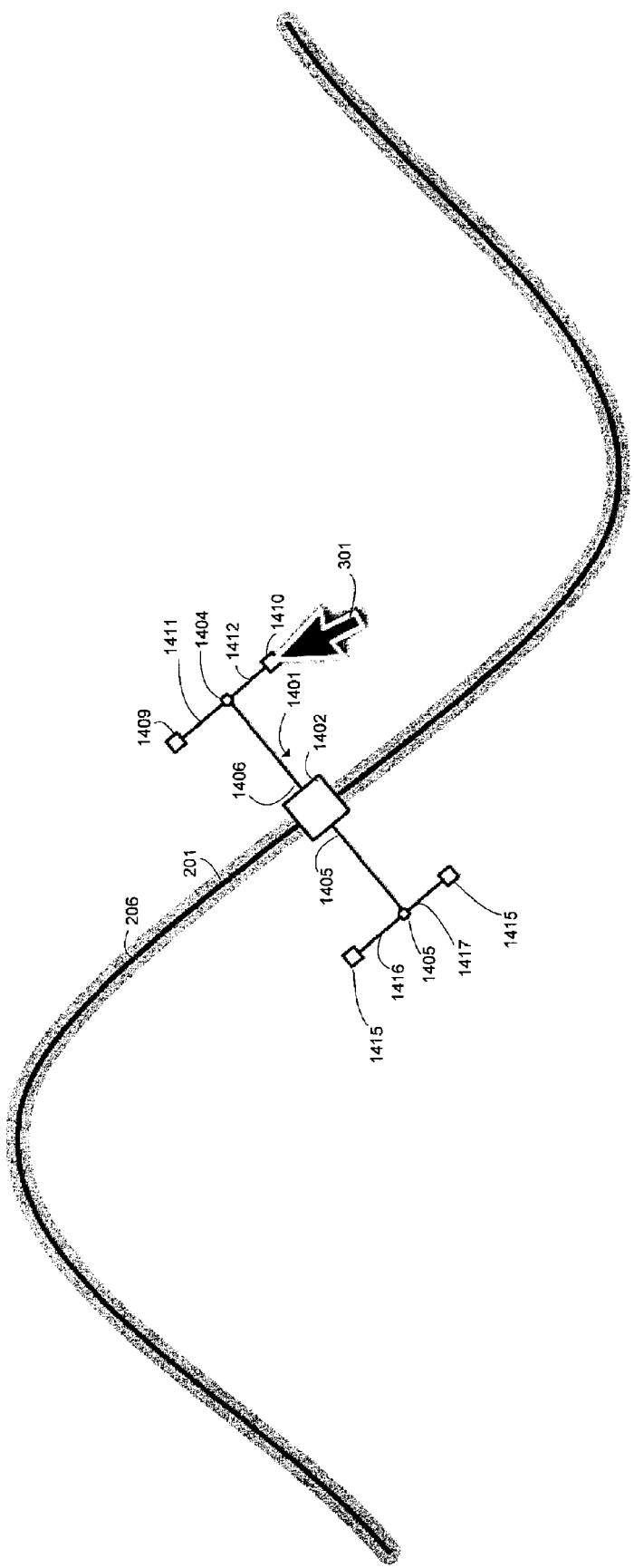

FIGS. 14 to 16 illustrate another exemplary characteristic adjustment control 1401 that allows for the adjustment of two or more characteristics of the paint stroke 201. Like the characteristic adjustment control 501, the characteristic adjustment control 1401 includes a shaped marker 1402 rendered above an anchor point, a first drag point handle 1404, and a second drag point handle 1405. Similarly, the first drag point handle 1404 and the second drag point handle are connected to the shaped marker 1401 by adjustable connecting lines 1406 and 1407, respectively, which lengthen and contract to contact the shaped marker 1401 and the drag point handles as the drag point handles are adjusted.

Unlike the characteristic adjustment control 501, however, the first drag point handle 1404 further includes a first drag point sub-handle 1409 and a second drag point sub-handle 1410, which extend from the first drag point handle 1404 along an axis perpendicular to the axis defined by the adjustable connecting lines 1406 and 1407. The first drag point sub-handle 1409 and the second drag point sub-handle 1410 are connected to the first drag point handle 1404 by adjustable connecting lines 1411 and 1412, respectively. When adjusted, the first drag point sub-handle 1409 and the second drag point sub-handle 1410 remain equidistant from the first drag point handle 1404.

The second drag point handle 1405 includes similar components corresponding to the first drag point handle 1404, including a third drag point sub-handle 1414 and a fourth drag point sub-handle 1415, connected to the second drag point handle 1405 by way of adjustable connecting lines 1416 and 1417, respectively. The components of third and fourth drag point sub-handles mirror the position and function of the first and second drag point sub-handles, respectively.

Before, after, or during the adjustment of the first or second drag point handles 1405, the user may also adjust a second characteristic by adjusting the drag point sub-handles. For instance, the user may adjust the position of the first drag point handle 1404 to affect the width of the paint stroke at the anchor point, and adjust the position of the second drag point sub-handle 1410 to affect the fall-off value. FIGS. 15 and 16 illustrate the selection and adjustment of the second drag point sub-handle 1401 using the cursor 301, and the corresponding movement of the first drag point sub-handle and the sub-handles of the second drag point handle 1405.

FIGS. 17 to 25 illustrate the in-context adjustment of another exemplary paint stroke, in various stages of adjustment. Like the paint stroke 206, the paint stroke 1701 is created by moving a circular brush icon 1702 from an origin point 1704 to a destination point 1705 on the display, along a path 1706. Unlike the paint stroke 206, which is defined as a single continuous region, the paint stroke 1701 includes evenly-spaced, non-overlapping, circular sub-elements, such as 1707a to 1707z, generally aligned with the path 1706. The sub-elements 1707 are illustrated in FIG. 17 as including very little or no jitter, since the center of each of the sub-elements is disposed approximately over the path, with little or no offset. An anchor point 1709 is defined on the path 1706, associated with a shaped marker 1710.

When the anchor point 1709 is selected with the cursor 301 (FIG. 18), for example when the cursor 301 is located in the vicinity of, or selects the shaped marker 1710, a characteristic adjustment control 1901 is rendered over the anchor point 1709 (FIG. 19). The characteristic adjustment control 1901 is similar in structure and function to the characteristic adjustment control 1901, and enables a user to adjust at least two characteristics of the paint stroke 1701. In an alternate implementation, the characteristic adjustment control 1901 enables the user to adjust one characteristic of the paint stroke 1701 for each of the drag point handles and sub-handles.

The characteristic adjustment control 1901 includes the shaped marker 1710 rendered above an anchor point 1709, a first drag point handle 1902, and a second drag point handle 1904. The first drag point handle 1902 and the second drag point handle 1904 are connected to the shaped marker 1710 by adjustable connecting lines 1905 and 1906, respectively, which lengthen and contract to contact the shaped marker 1710 and the drag point handles, as the drag point handles are adjusted.

The first drag point handle 1404 further includes first drag point sub-handle 1907 and second drag point sub-handle 1909, which extend from the first drag point handle 1902 along an axis perpendicular to the axis defined by the adjustable connecting lines 1905 and 1906. The first drag point sub-handle 1907 and the second drag point sub-handle 1909 are connected to the first drag point handle 1902 by adjustable connecting lines 1910 and 1911, respectively. When adjusted, the first drag point sub-handle 1907 and second drag point sub-handle 1909 remain equidistant from the first drag point handle 1902.

The second drag point handle 1904 includes third and fourth drag point sub-handles which mirror the position of the first drag point sub-handle 1907 and second drag point sub-handle 1909, respectively, when adjusted. The user may alter a first characteristic of the paint stroke 1701 by adjusting either or both of first drag point handle 1902 and second drag point handle 1904, and may alter a second characteristic of the paint stroke 1701 by adjusting any or all of the first through fourth drag point sub-handles.

Figure 20:
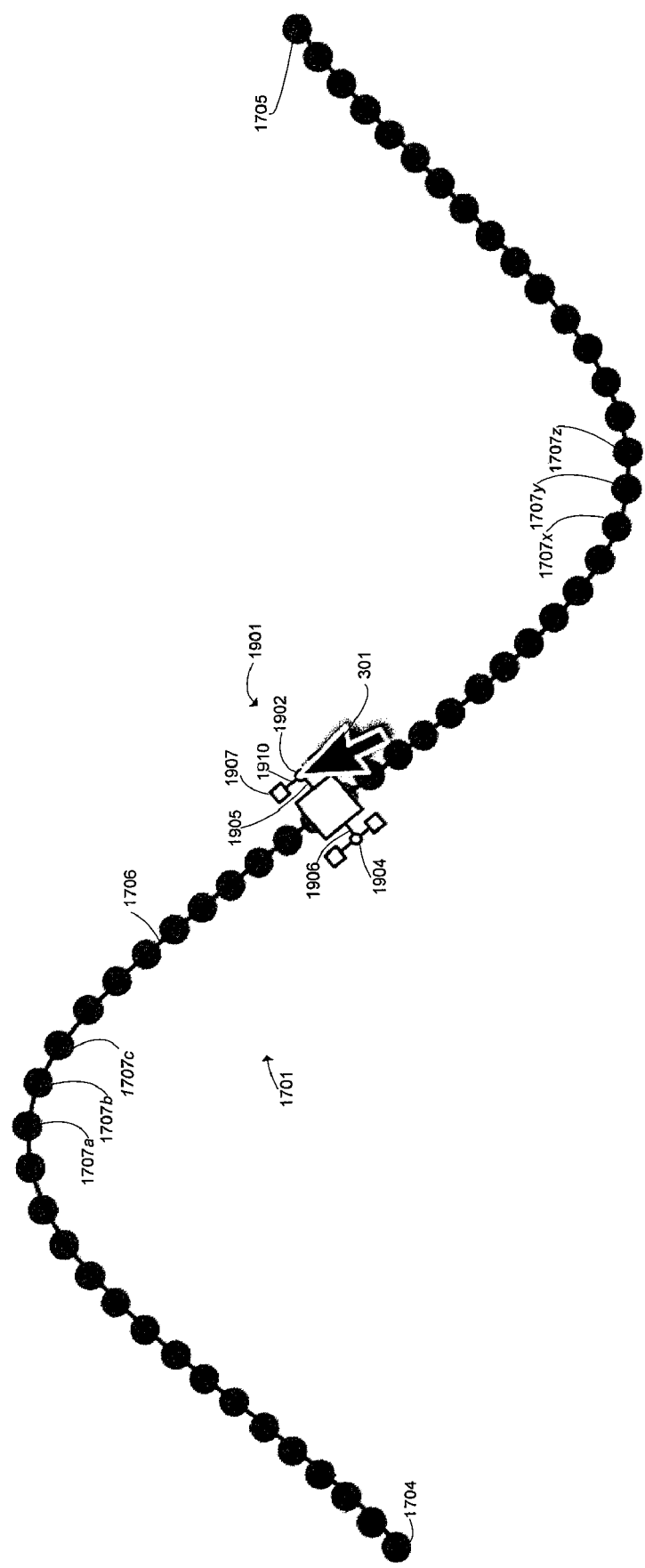
Figure 21:
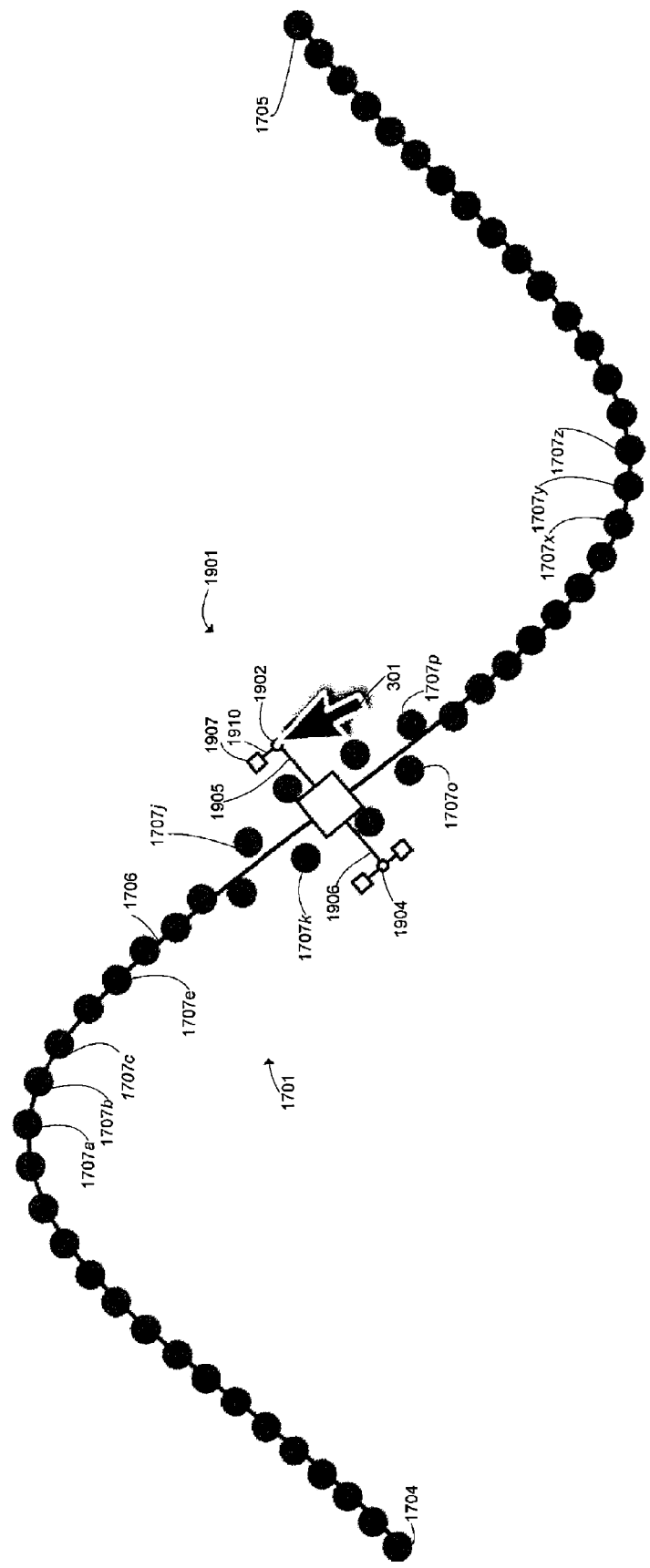

FIGS. 20 to 22 illustrate the input of an adjustment input for the jitter characteristic, in which cursor 301 selects the first drag point handle 1902 with a mouse down event or a keyboard keystroke, and drags the first drag point handle 1902 along an axis perpendicular to the path 1706 at the anchor point 1709, or along a predetermined mouse axis. As the first drag point handle 1902 is adjusted further from the anchor point 1709, the jitter of the paint stroke 1702 increases at a region of the paint stroke 1701 centered around the anchor point 1709. In particular, the distance between sub-elements 1707j to 1707p and the path 1706 increases, with adjacent sub-elements deviating on opposite sides of the path 1706.

Before, after, or during the dragging operation of the first or second drag point handles 1902 and 1904, the user may also adjust a fall-off characteristic by adjusting one or more of the drag point sub-handles. For instance, the user may adjust the position of the first drag point handle 1902 to affect the jitter characteristic of the of the paint stroke sub-elements centered around at the anchor point, and adjust the position of the second drag point sub-handle 1909 to affect the fall-off characteristic of the paint stroke sub-elements value. As indicated above-fall-off refers to the affect that a width or jitter adjustment at an anchor point affects adjacent points surrounding the anchor point.

Figure 23:
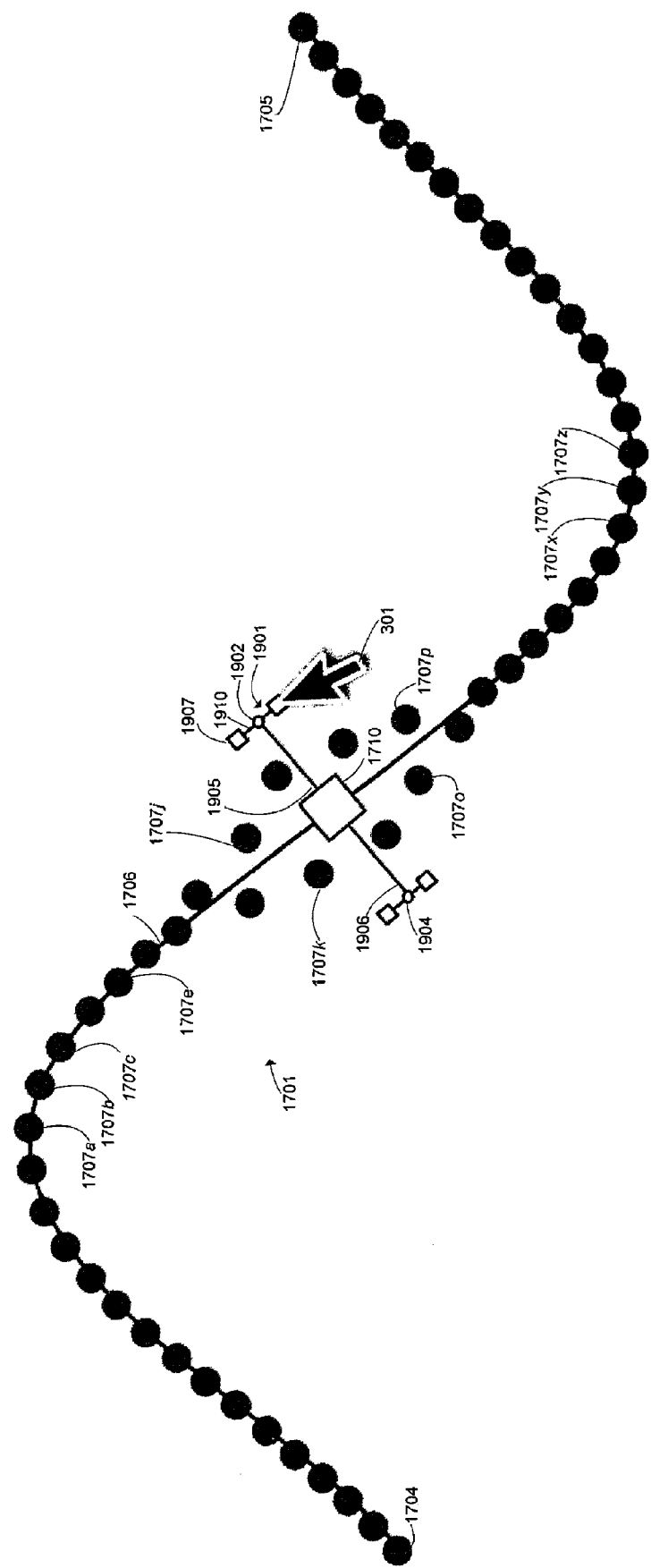
Figure 24:
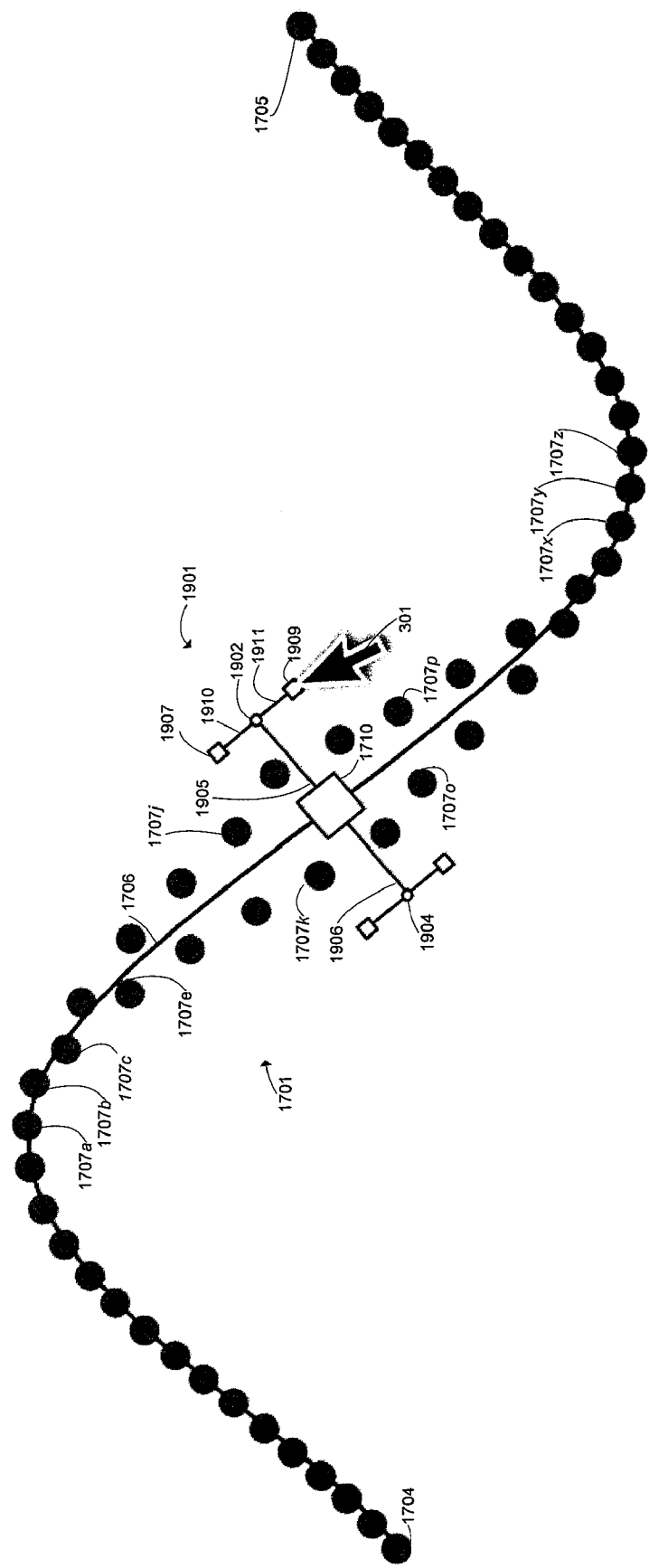
Figure 25:
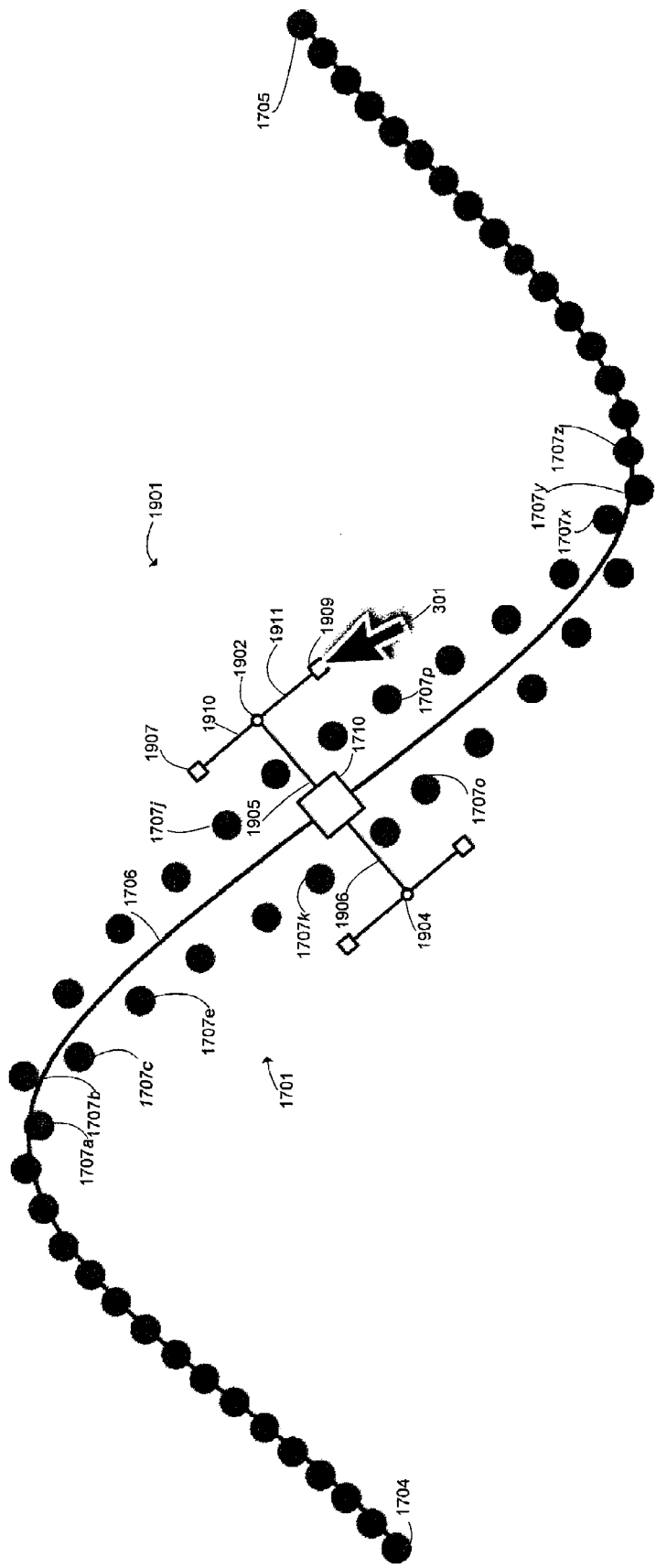

FIGS. 23 to 25 illustrate the adjustment of the fall-off characteristic for the jitter-adjusted paint stroke 1701 illustrated in FIG. 22. In FIG. 23, the distance between the respective drag point sub-handles and the handles is small, reflecting a small fall-off value. As shown in FIG. 23, the small fall-off value manifests itself in a quick drop off in an effect of a width or jitter adjustment, visibly affecting points of the paint stroke 1701 that are nearer to the anchor point 1709.

As shown in FIGS. 24 and 25, as the second drag point sub-handle 1909 is adjusted to be further from the first drag point handle 1902, the first, third and fourth drag point sub-handles mirror this adjustment, and the fall-off value increases. With the adjusted fall-off value, the adjusted jitter characteristic manifests as a more gradual drop off in the effect of the jitter adjustment, visibly affecting points of the paint stroke 1701 that are further from the anchor point 1709, such as sub-elements 1707a and 1707z.

Figure 26:
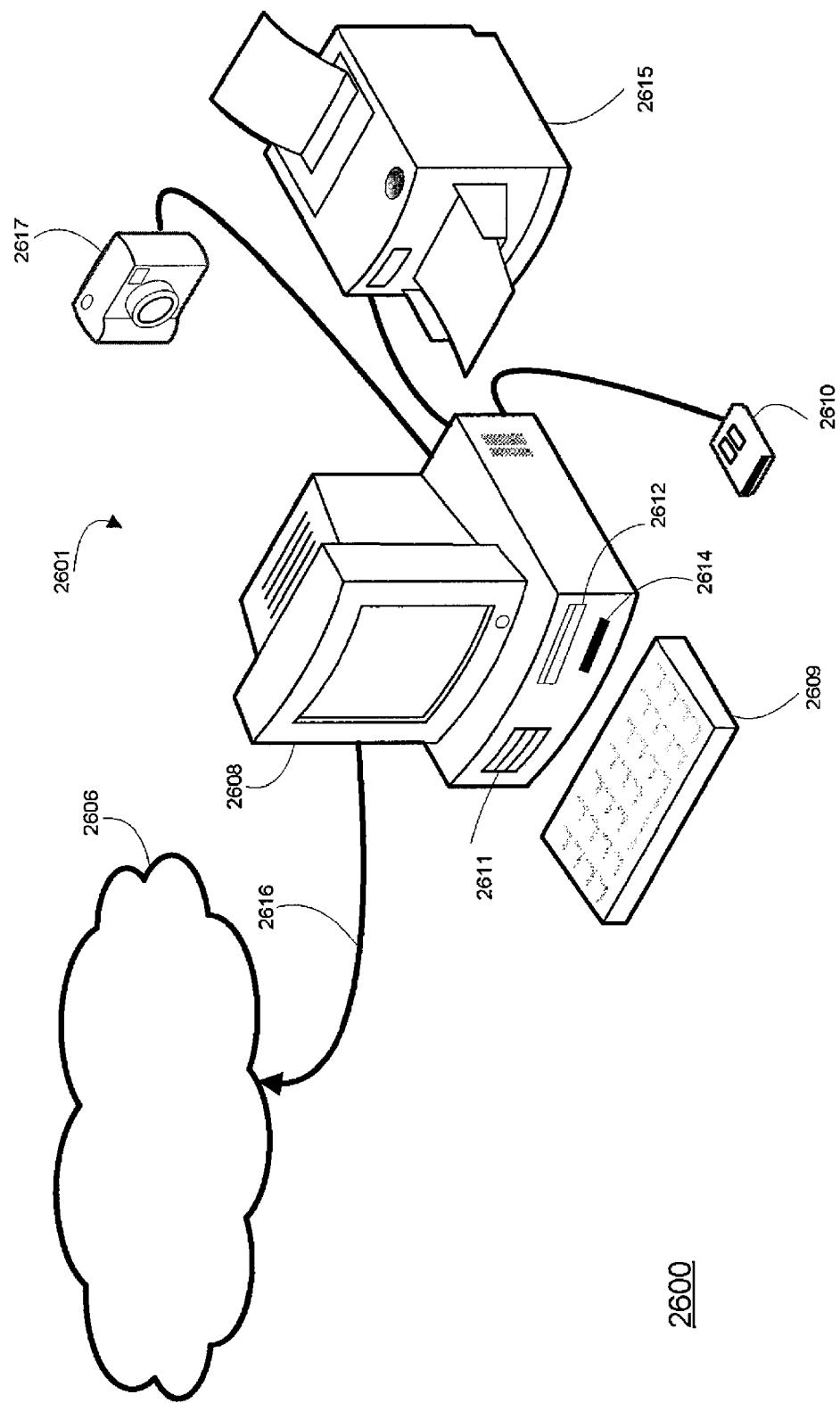
FIG. 26 depicts the exterior appearance of an exemplary system that implements the in-context adjustment of a paint stroke characteristic, according to one general implementation.

FIG. 26 depicts the exterior appearance of an example system 2600, including a computer 2601, which implements in-context paint stroke characteristic adjustment. Briefly, the computer 2601 includes a display, an input device, and a processor. The display renders a paint stroke, and renders a characteristic adjustment control adjacent to an anchor point. The input device, which may be, for example, a mouse or a keyboard, receives a first user input selecting a path of the paint stroke, and receives a second user input via the characteristic adjustment control. The processor defines the anchor point on the path based on the first user input, and adjusts a characteristic of the paint stroke at the anchor point based on the second user input.

In more detail, the hardware environment of the computer 2601 includes a display monitor 2608 for displaying text and images to a user, a keyboard 2609 for entering text data and user commands into the computer 2601, a mouse 2610 for pointing, selecting and adjusting objects displayed on the display monitor 2608, a fixed disk drive 2611, a removable disk drive 2612, a tape drive 2614, a hardcopy output device 2615, a computer network connection 2616, and a digital input device 2617.

The display monitor 2608 displays graphics, images, and text that comprise the display for the software applications used by the computer 2601, as well as the operating system programs necessary to operate the computer 2601. A user uses the keyboard 2609 to enter commands and data to operate and control the computer operating system programs as well as the paint stroke characteristic adjustment application and other application programs. The user uses the mouse 2610 to select and adjust graphics and text objects displayed on the display monitor 2608 as part of the interaction with and control of the computer 2601 and applications running on the computer 2601. The mouse 2610 is any type of pointing device, and may be a joystick, a trackball, a touch-pad, or other pointing device. Furthermore, the digital input device 2617 allows the computer 2601 to capture digital images, and may be a scanner, a digital camera, a digital video camera, or other digital input device. Software used to provide for in-context paint stroke characteristic adjustment is stored locally on computer readable memory media, such as the fixed disk drive 2611.

In a further implementation, the fixed disk drive 2611 itself may include a number of physical drive units, such as a redundant array of independent disks ("RAID"), or may be a disk drive farm or a disk array that is physically located in a separate computing unit. Such computer readable memory media allow the computer 2601 to access computer-executable process steps, application programs and the like, stored on removable and non-removable memory media.

The wireless or wireline computer network connection 2616 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 2606 may be one or more of a LAN network, a corporate or government WAN network, the Internet, or other network.

The computer network connection 2616 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 2612 is a removable storage device that is used to off-load data from the computer 2601 or upload data onto the computer 2601. The removable disk drive 2612 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files are stored on disks, which are stored on the fixed disk drive 2611 or on removable media for the removable disk drive 2612.

The tape drive 2614 is a tape storage device that is used to off-load data from the computer 2601 or to upload data onto the computer 2601. The tape drive 2614 may be a quarter-inch cartridge ("QIC"), 4 mm digital audio tape ("DAT"), 8 mm digital linear tape ("DLT") drive, or other type of tape.

The hardcopy output device 2615 provides an output function for the operating system programs and applications. The hardcopy output device 2615 may be a printer or any output device that produces tangible output objects, including textual or image data or graphical representations of textual or image data. While the hardcopy output device 2615 is depicted as being directly connected to the computer 2601, it need not be. For instance, the hardcopy output device 2615 may be connected to computer 2601 via a network interface, such as a wireline or wireless network.

Furthermore, although the computer 2601 is illustrated in FIG. 26 as a desktop PC, in further implementations the computer 2601 may be a laptop, a workstation, a midrange computer, a mainframe, an embedded system, telephone, a handheld or tablet computer, a PDA, or other type of computer.

Figure 27:
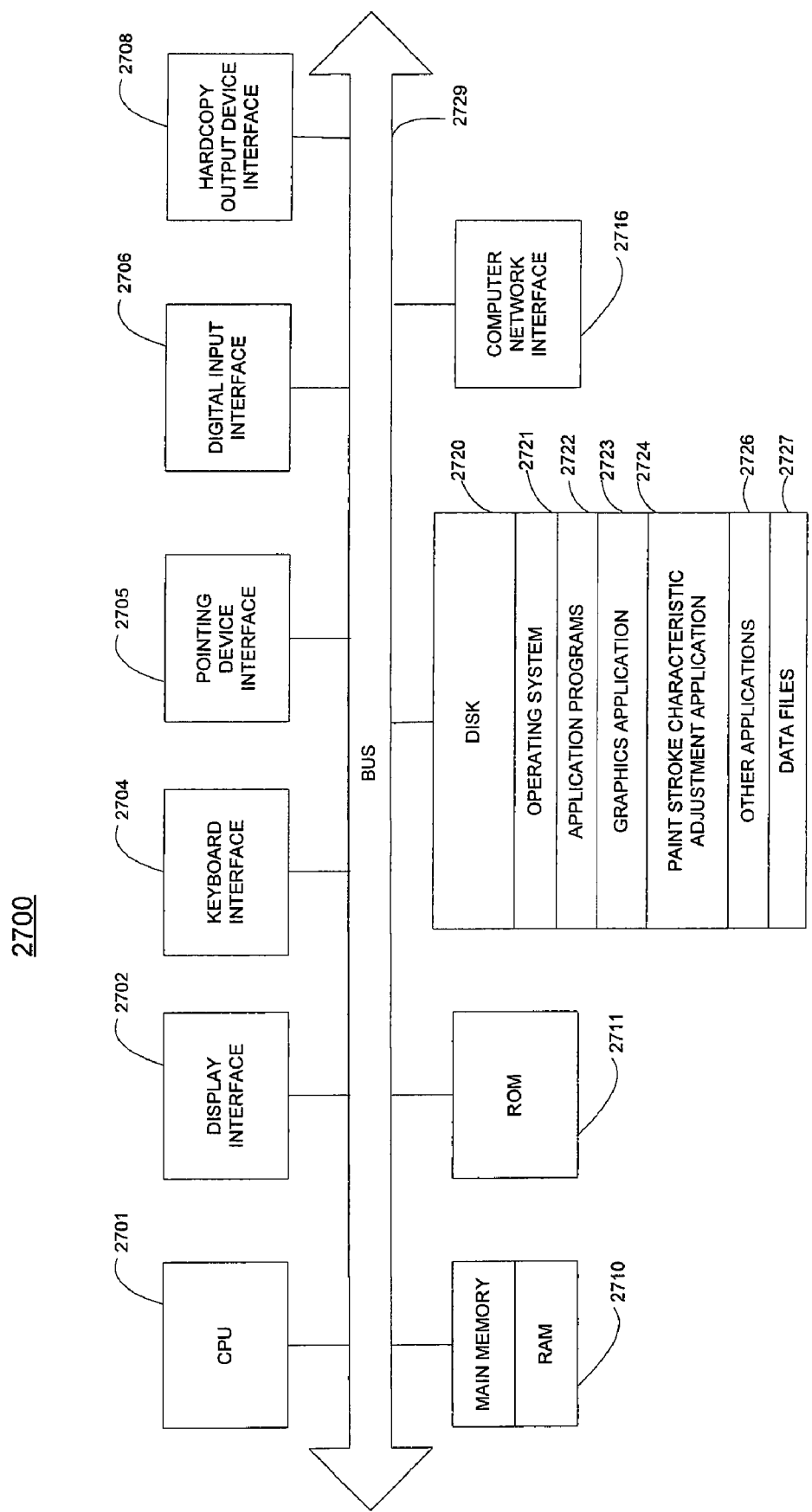
FIG. 27 depicts an exemplary internal architecture of the computer depicted in FIG. 1.

FIG. 27 depicts an example of an internal architecture of the computer 2601. The computing environment includes a computer central processing unit ("CPU") 2701 where the computer instructions that comprise an operating system or an application are processed; a display interface 2702 which provides a communication interface and processing functions for rendering graphics, images, and texts on the display monitor 2608; a keyboard interface 2704 which provides a communication interface to the keyboard 2609; a pointing device interface 2705 which provides a communication interface to the mouse 2610 or an equivalent pointing device; a digital input interface 2706 which provides a communication interface to the digital input device 2617; a hardcopy output device interface 2708 which provides a communication interface to the hardcopy output device 2615; a random access memory ("RAM") 2710 where computer instructions and data are stored in a volatile memory device for processing by the computer CPU 2701; a read-only memory ("ROM") 2711 where invariant low-level systems code or data for basic system functions such as basic input and output ("I/O"), startup, or reception of keystrokes from the keyboard 2609 are stored in a non-volatile memory device; a storage 2720 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 2721, application programs 2722 (including graphics application 2723, paint stroke characteristic adjustment application 2724, and other applications 2726 as necessary) and data files 2727 are stored; and a computer network interface 2716 which provides a communication interface to the network 2606 over the computer network connection 2616. The constituent devices and the computer CPU 2701 communicate with each other over the computer bus 2729.

Briefly, a computer program product is tangibly embodied in disk 2720, a machine-readable storage medium. Briefly, the computer program product includes instructions that, when read by a machine, operate to cause a data processing apparatus to receive a first user input selecting a path of a paint stroke rendered on a display, define an anchor point on the path based on the first user input, and render a characteristic adjustment control adjacent to the anchor point. The computer program product also includes instructions that operate to cause a data processing apparatus to receive a second user input via the characteristic adjustment control, and adjust a characteristic of the paint stroke at the anchor point based on the second user input.

The RAM 2710 interfaces with the computer bus 2729 so as to provide quick RAM storage to the computer CPU 2701 during the execution of software programs such as the operating system application programs, and device drivers. More specifically, the computer CPU 2701 loads computer-executable process steps from the fixed disk drive 2611 or other memory media into a field of the RAM 2710 in order to execute software programs. Data is stored in the RAM 2710, where the data is accessed by the computer CPU 2701 during execution.

Also shown in FIG. 27, the computer 2601 stores computer-executable code for a operating system 2721, and application programs 2722 such as word processing, spreadsheet, presentation, gaming, or other applications. Although it is possible to provide for in-context paint stroke characteristic adjustment using the above-described implementation, it is also possible to implement the functions according to the present disclosure as a dynamic link library ("DLL"), or as a plug-in to other application programs such as an Internet web-browser such as the APPLE® SAFARI® web browser or the MICROSOFT® Internet Explorer web browser.

The computer CPU 2701 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 2701 is more than one processing unit, including a multiple CPU configuration found in high-performance workstations and servers, or a multiple scalable processing unit found in mainframes.

The operating system 2721 may be APPLE® MAC OS X® for INTEL® and POWERPC® based workstations and servers; MICROSOFT® WINDOWS NT®/WINDOWS® 2000/

WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1821 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 26 and 27 illustrate one possible implementation of a computing system that executes program code, or program or process steps, configured to effectuate in-context paint stroke characteristic adjustment, other types of computers may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving a first user input selecting a path of a paint stroke rendered on a display;
   defining, by a data processing apparatus, an anchor point on the paint stroke path based on the first user input;
   rendering, by the data processing apparatus, a characteristic adjustment control adjacent to the anchor point, the characteristic adjustment control including a first drag point handle aligned along an axis that passes through the characteristic adjustment control and forms an angle with the paint stroke path, the first drag point handle including a sub-handle, wherein the first drag point handle and the sub-handle are configured to adjust characteristics of the paint stroke in response to user input;
   receiving, by the data processing apparatus, a second user input via the characteristic adjustment control, the second user input including an input to the sub-handle; and
   adjusting, by the data processing apparatus, a characteristic of the paint stroke at the anchor point based on the second user input.

2. The computer-implemented method of claim 1,
   wherein the first user input comprises a mouse down event on the path, and
   wherein the second user input comprises a mouse drag event.

3. The computer-implemented method of claim 1, wherein the first user input and/or the second user input comprise keyboard keystrokes.

4. The computer-implemented method of claim 1, wherein the paint stroke characteristic is a width characteristic of the paint stroke, a color characteristic of the paint stroke, a spacing characteristic of sub-elements of the paint stroke, a jitter characteristic of the sub-elements of the paint stroke, an opacity characteristic, an angle characteristic of the paint stroke, or a fall-off characteristic of the paint stroke.

5. The computer-implemented method of claim 1, wherein the characteristic adjustment control's axis is substantially perpendicular to the paint stroke path.

6. The computer-implemented method of claim 5, wherein the second user input further comprises a mouse drag event dragging the first drag point handle.

7. The computer-implemented method of claim 5, wherein the characteristic adjustment control comprises a second drag point handle aligned along the axis on an opposite side of the path than the first drag point handle, the first and second drag point handles being equidistant from the anchor point.

8. The computer-implemented method of claim 1, further comprising:
   receiving a third user input selecting the anchor point; and
   deleting the anchor point based on receiving the third user input.

9. The computer-implemented method of claim 1, wherein rendering the characteristic adjustment control adjacent to the anchor point further comprises rendering the characteristic adjustment control over the anchor point.

10. The computer-implemented method of claim 1, wherein the paint stroke comprises a plurality of sub-elements.

11. The computer-implemented method of claim 1, wherein the paint stroke is defined by a movement of a brush icon along the path.

12. The computer-implemented method of claim 1, further comprising re-rendering the paint stroke based on the adjusted paint stroke characteristic.

13. The computer-implemented method of claim 1, further comprising rendering the path over the paint stroke.

14. The computer-implemented method of claim 1, wherein adjusting the paint stroke characteristic at the anchor point further comprises adjusting the paint stroke characteristic at the anchor point and an adjacent point adjacent to the anchor point, based on the second user input.

15. The computer-implemented method of claim 1, wherein adjusting the paint stroke characteristic at the adjacent point is further based on a fall-off value.

16. The computer-implemented method of claim 1, further comprising:
   receiving a third user input selecting the path;
   defining a second anchor point based on the third user input; and
   adjusting a characteristic of the paint stroke at the second anchor point based on the second user input.

17. The computer-implemented method of claim 1, further comprising:
   receiving a third user input;
   translating the anchor point along the path based on the third user input.

18. The computer-implemented method of claim 17, wherein the third user input comprises a mouse drag event.

19. The computer-implemented method of claim 17, wherein the third user input further comprises a mouse drag event along the path.

20. The computer-implemented method of claim 17, wherein the third user input further comprises a mouse drag event along an axis.

21. A non-transitory computer-readable medium storing instructions executable by a data processing apparatus to perform operations comprising:
   receiving a first user input selecting a path of a paint stroke rendered on a display;
   defining an anchor point on the path based on the first user input;

rendering a characteristic adjustment control adjacent to the anchor point, the characteristic adjustment control including a first drag point handle aligned along an axis that passes through the characteristic adjustment control and forms an angle with the paint stroke path, the first drag point handle including a sub-handle, wherein the first drag point handle and the sub-handle are configured to adjust characteristics of the paint stroke in response to user input;

receiving a second user input via the characteristic adjustment control, the second user input including an input to the sub-handle; and adjusting a characteristic of the paint stroke at the anchor point based on the second user input.

22. The medium of claim 21,
wherein the first user input comprises a mouse down event on the path, and
wherein the second user input comprises a mouse drag event.

23. The medium of claim 21, wherein the first user input and/or the second user input comprise keyboard keystrokes.

24. The medium of claim 21, wherein the paint stroke characteristic is a width characteristic of the paint stroke, a color characteristic of the paint stroke, a spacing characteristic of sub-elements of the paint stroke, a jitter characteristic of the sub-elements of the paint stroke, an opacity characteristic, an angle characteristic of the paint stroke, or a fall-off characteristic of the paint stroke.

25. The medium of claim 21, wherein the characteristic adjustment control's axis is substantially perpendicular to the paint stroke path.

26. The medium of claim 25, wherein the second user input further comprises a mouse drag event dragging the first drag point handle.

27. The medium of claim 25, wherein the characteristic adjustment control comprises a second drag point handle aligned along the axis on an opposite side of the path than the first drag point handle, the first and second drag point handles being equidistant from the anchor point.

28. The medium of claim 21, the operations further comprising:
receiving a third user input selecting the anchor point; and
deleting the anchor point based on receiving the third user input.

29. The medium of claim 21, wherein rendering the characteristic adjustment control adjacent to the anchor point further comprises rendering the characteristic adjustment control over the anchor point.

30. The medium of claim 21, wherein the paint stroke comprises a plurality of sub-elements.

31. The medium of claim 21, wherein the paint stroke is defined by a movement of a brush icon along the path.

32. The medium of claim 21, the operations further comprising re-rendering the paint stroke based on the adjusted paint stroke characteristic.

33. The medium of claim 21, the operations further comprising rendering the path over the paint stroke.

34. The medium of claim 21, wherein adjusting the paint stroke characteristic at the anchor point further comprises adjusting the paint stroke characteristic at the anchor point and an adjacent point adjacent to the anchor point, based on the second user input.

35. The medium of claim 21, wherein adjusting the paint stroke characteristic at the adjacent point is further based on a fall-off value.

36. The medium of claim 21, the operations further comprising:
receiving a third user input selecting the path;
defining a second anchor point based on the third user input; and
adjusting a characteristic of the paint stroke at the second anchor point based on the second user input.

37. The medium of claim 21, the operations further comprising:
receiving a third user input;
translating the anchor point along the path based on the third user input.

38. The medium of claim 37, wherein the third user input comprises a mouse drag event.

39. The medium of claim 37, wherein the third user input further comprises a mouse drag event along the path.

40. The medium of claim 37, wherein the third user input further comprises a mouse drag event along an axis.

41. A device comprising:
a display configured to:
render a paint stroke, and
render a characteristic adjustment control adjacent to an anchor point, the characteristic adjustment control including a first handle passing through the characteristic adjustment control and perpendicular to the paint stroke, the first handle including a sub-handle perpendicular to the first handle, wherein the first drag point handle and the sub-handle are configured to adjust characteristics of the paint stroke in response to user input;
an input device configured to:
receive a first user input selecting a path of the paint stroke, and
receive a second user input via the characteristic adjustment control, the second user input including an input to the sub-handle; and
a processor configured to:
define the anchor point on the path based on the first user input, and
adjust a characteristic of the paint stroke at the anchor point based on the second user input.

42. The device of claim 41, wherein the input device is a mouse.

43. The device of claim 41, wherein the input device is a keyboard.

44. A system comprising:
a processor; and
a non-transitory computer-readable medium storing instructions executable by the processor to perform operations comprising:
receiving a first user input selecting a path of a paint stroke rendered on a display;
defining an anchor point on the path based on the first user input;
rendering a characteristic adjustment control adjacent to the anchor point, the characteristic adjustment control including a first drag point handle aligned along an axis that passes through the characteristic adjustment control and forms an angle with the paint stroke path, the first drag point handle including a sub-handle, wherein the first drag point handle and the sub-handle are configured to adjust characteristics of the paint stroke in response to user input;
receiving a second user input via the characteristic adjustment control, the second user input including an input to the sub-handle; and
adjusting a characteristic of the paint stroke at the anchor point based on the second user input.

45. The system of claim 44,
wherein the first user input comprises a mouse down event on the path, and
wherein the second user input comprises a mouse drag event.

46. The system of claim 44, wherein the first user input and/or the second user input comprise keyboard keystrokes.

47. The system of claim 44, wherein the paint stroke characteristic is a width characteristic of the paint stroke, a color characteristic of the paint stroke, a spacing characteristic of sub-elements of the paint stroke, a jitter characteristic of the sub-elements of the paint stroke, an opacity characteristic, an angle characteristic of the paint stroke, or a fall-off characteristic of the paint stroke.

48. The system of claim 44, wherein the characteristic adjustment control's axis is substantially perpendicular to the paint stroke path.

49. The system of claim 48, wherein the second user input further comprises a mouse drag event dragging the first drag point handle.

50. The system of claim 48, wherein the characteristic adjustment control comprises a second drag point handle aligned along the axis on an opposite side of the path than the first drag point handle, the first and second drag point handles being equidistant from the anchor point.

51. The system of claim 44, the operations further comprising:
receiving a third user input selecting the anchor point; and
deleting the anchor point based on receiving the third user input.

52. The system of claim 44, wherein rendering the characteristic adjustment control adjacent to the anchor point further comprises rendering the characteristic adjustment control over the anchor point.

53. The system of claim 44, wherein the paint stroke comprises a plurality of sub-elements.

54. The system of claim 44, wherein the paint stroke is defined by a movement of a brush icon along the path.

55. The system of claim 44, the operations further comprising re-rendering the paint stroke based on the adjusted paint stroke characteristic.

56. The system of claim 44, the operations further comprising rendering the path over the paint stroke.

57. The system of claim 44, wherein adjusting the paint stroke characteristic at the anchor point further comprises adjusting the paint stroke characteristic at the anchor point and an adjacent point adjacent to the anchor point, based on the second user input.

58. The system of claim 44, wherein adjusting the paint stroke characteristic at the adjacent point is further based on a fall-off value.

59. The system of claim 44, the operations further comprising:
receiving a third user input selecting the path;
defining a second anchor point based on the third user input; and
adjusting a characteristic of the paint stroke at the second anchor point based on the second user input.

60. The system of claim 44, the operations further comprising:
receiving a third user input;
translating the anchor point along the path based on the third user input.

61. The system of claim 60, wherein the third user input comprises a mouse drag event.

62. The system of claim 60, wherein the third user input further comprises a mouse drag event along the path.

63. The system of claim 60, wherein the third user input further comprises a mouse drag event along an axis.

\* \* \* \* \*